(12) United States Patent
Kasturi et al.

(10) Patent No.: US 10,157,347 B1
(45) Date of Patent: Dec. 18, 2018

(54) ADAPTABLE SYSTEMS AND METHODS FOR PROCESSING ENTERPRISE DATA

(71) Applicant: Predii, Inc., Palo Alto, CA (US)

(72) Inventors: Tilak B. Kasturi, Palo Alto, CA (US); Hieu Ho, San Jose, CA (US); Aniket Dalal, Pune (IN)

(73) Assignee: Predii, Inc., Palo Alto, CA (US)

( * ) Notice: Subject to any disclaimer, the term of this patent is extended or adjusted under 35 U.S.C. 154(b) by 0 days.

(21) Appl. No.: 14/533,085

(22) Filed: Nov. 4, 2014

Related U.S. Application Data

(60) Provisional application No. 61/899,868, filed on Nov. 4, 2013.

(51) Int. Cl.
*G06N 99/00* (2010.01)
*G06F 17/30* (2006.01)

(52) U.S. Cl.
CPC ....... *G06N 99/005* (2013.01); *G06F 17/3064* (2013.01); *G06F 17/30648* (2013.01); *G06F 17/30684* (2013.01); *G06F 17/30705* (2013.01)

(58) Field of Classification Search
CPC combination set(s) only.
See application file for complete search history.

(56) References Cited

U.S. PATENT DOCUMENTS

| | | | |
|---|---|---|---|
| 6,493,723 B1 | 12/2002 | Busche | |
| 9,542,412 B2* | 1/2017 | Bates-Haus | G06F 17/30156 |
| 9,672,497 B1* | 6/2017 | Lewis | G06F 17/277 |
| 10,013,679 B1* | 7/2018 | Lewis | G06Q 10/20 |
| 2006/0106595 A1 | 5/2006 | Brockett | |
| 2008/0270120 A1 | 10/2008 | Pestian | |
| 2009/0204237 A1 | 8/2009 | Sustaeta | |
| 2010/0293451 A1 | 11/2010 | Carus | |
| 2011/0106562 A1* | 5/2011 | Gogineni | G06Q 10/10 705/3 |
| 2011/0106563 A1* | 5/2011 | Kresl | G06Q 10/00 705/3 |

(Continued)

OTHER PUBLICATIONS

ACM Digital Library Just the right amount: extracting modules from ontologies Bernardo Cuenca Grau Ian Horrocks Yevgeny Kazakov Ulrike Sattler, University of Manchester WWW '07 Proceedings of the 16th international conference on World Wide Web pp. 717-726 May 8-12, 2007.*

*Primary Examiner* — Michael B Holmes

(57) ABSTRACT

A system, or platform, for processing enterprise data is configured to adapt to different domains and analyze data from various data sources and provide enriched results. The platform includes a data extraction and consumption module to translate domain specific data into defined abstractions, breaking it down for consumption by a feature extraction engine. A core engine, which includes a number of machine learning modules, such as a feature extraction engine, analyzes the data stream and produces data fed back to the clients via various interfaces. A learning engine incrementally and dynamically updates the training data for the machine learning by consuming and processing validation or feedback data. The platform includes a data viewer and a services layer that exposes the enriched data results. Integrated domain modeling allows the system to adapt and scale to different domains to support a wide range of enterprises.

11 Claims, 19 Drawing Sheets

(56) References Cited

U.S. PATENT DOCUMENTS

| | | | | |
|---|---|---|---|---|
| 2011/0112863 A1* | 5/2011 | Gogineni | ............... | G06Q 10/00 |
| | | | | 705/3 |
| 2012/0330869 A1* | 12/2012 | Durham | ................. | G06N 5/022 |
| | | | | 706/16 |
| 2013/0124582 A1* | 5/2013 | Yamamoto | ........ | G06F 17/30011 |
| | | | | 707/812 |
| 2015/0278241 A1* | 10/2015 | Bates-Haus | ....... | G06F 17/30156 |
| | | | | 707/692 |
| 2016/0328385 A1* | 11/2016 | Reiter | ..................... | G06F 17/28 |
| 2017/0075918 A1* | 3/2017 | Bates-Haus | ....... | G06F 17/30156 |

* cited by examiner

ADAPTABLE SYSTEMS AND METHODS FOR PROCESSING ENTERPRISE DATA

RELATED APPLICATION

This application claims the benefit of U.S. Provisional Application No. 61/899,868, filed Nov. 4, 2013. This application incorporates by reference U.S. Provisional Application No. 61/899,868 in its entirety.

This application incorporates by reference U.S. Patent Application No. 61/899,833, titled "Methods and systems for using natural language processing and machine-learning to produce vehicle-service content", which was filed on Nov. 4, 2013 and U.S. patent application Ser. No. 14/532,983, which was filed on Nov. 4, 2014, is titled "Methods and systems for using natural language processing and machine-learning to produce vehicle-service content".

TECHNICAL FIELD

The disclosed embodiments relate generally to computer systems and methods, and in particular to systems and methods for processing enterprise data.

BACKGROUND

Unless otherwise indicated herein, the approaches described in this section are not prior art to the claims in this application and are not admitted to be prior art by inclusion in this section.

Machine learning, a branch of artificial intelligence, concerns the construction and study of systems that can learn from data. For example, a machine learning system could be trained on email messages to learn to distinguish between spam and non-spam messages. After learning, it can then be used to classify new email messages into spam and non-spam folders.

Machine learning typically deals with representation and generalization. Representation of data instances and functions evaluated on these instances are part of all machine learning systems. Generalization is the property that the system will perform well on unseen data instances; the conditions under which this can be guaranteed are a key object of study in the subfield of computational learning theory.

A core objective of a learner is to generalize from its experience. Generalization in this context is the ability of a learning machine to perform accurately on new, unseen examples/tasks after having experienced a learning data set. The training examples come from some generally unknown probability distribution (considered representative of the space of occurrences) and the learner has to build a general model about this space that enables it to produce sufficiently accurate predictions in new cases.

Additional background and details regarding machine learning and associated methods and algorithms may be found in Sebastiani, Fabrizio (2002) Machine learning in automated text categorization, ACM Computing Surveys, 34(1):1-47, which is incorporated by reference herein in its entirety.

To date, knowledge discovery from existing information sources inside an enterprise has been the focus of enterprise dataset platforms and business intelligence platforms. However, the challenge of building context of enterprise data in real-time, e.g., as data is streaming in from end-user applications where the enterprise is selling or providing services through enterprise applications, has long been a challenging and expensive task.

Although relational database systems and business intelligence systems apply online analytical processing techniques to synthesize and present data, a typical enterprise today has large variety of data (documents, transactions, field operations, financial, etc.) in variety of data formats (unstructured, structured) and with high frequency of updates (velocity). Because of the volume, velocity and variety of data that may be received, and the limitations of available data processing and management systems, most enterprises are only able to use, or make sense of, a fraction of the data or other information they receive.

Moreover, available data analysis and processing systems and methods are not capable of interpreting and quickly adapting to a given context or contexts of enterprise data of disparate enterprise areas, or industries. For example, different types of service repair businesses have different types of information concerning problem reporting, diagnoses, repairs, and service recommendations depending on the type of domain involved, e.g., automotive, healthcare, home appliances, information technology, or aeronautics.

Thus, there remains a need for an improved and adaptable system and method for analyzing and processing large volumes of data across different enterprises and for different enterprise applications.

SUMMARY

Systems and methods described herein improve utility of enterprise data by modeling data into features applicable to enterprise context and using the model to drive classification and clustering of data. Enterprise context can be, for example, service repair data, customer transactional data, server performance data, or various other types of data applicable to an enterprise or an industry, or a particular service or application within an enterprise or industry. In some embodiments, knowledge of a domain expert may be applied and incorporated into applications and methods for building enterprise context for data.

In one embodiment, a system is configured to analyze and interpret the context of data from a variety of different enterprises by adapting to a given context or contexts of enterprise data. For example, a service repair business has enterprise-specific information about issues or symptoms, diagnoses, recommended actions, repairs, parts, and/or recommendations depending on the type of domain they deal with: automotive, healthcare, home appliances, electronics, aeronautics.

In one aspect, a method of processing enterprise data includes incorporating domain expert knowledge into a base learning model, receiving data from a enterprise customer (e.g., using an enterprise application), dissecting and interpreting inputs (e.g., textual inputs and/or numerical inputs) into multiple features of interest modeled by the domain expert, storing feature data, converting feature data using machine learning algorithms, and developing enterprise specific "metadata" that may be used by client applications associated with the enterprise to retrieve desired information.

In another aspect, a query/response engine is configured to receive and process enterprise application requests, e.g., from one or more of the client applications, and feedback from domain experts may also be applied to improve the quality and accuracy of data and associated models within the system.

In another aspect, systems and methods provide an ability to build analytical models over large amounts enterprise data using high-level abstraction to facilitate easy integration into any external enterprise solution(s).

In other aspects, a natural language processing system includes instructions for receiving unstructured information or unstructured numeric and/or alphanumeric textual information, e.g. repair information written in "incomplete" natural language, broken words and/or gibberish, converting it into contextual metadata of rich information, and suggesting a solution to for the repair with high accuracy (e.g., 70%-90% or more). "Incomplete" refers to sentences that are not fully formed, broken words, has some cryptic meaning that is only meaningful to an domain expert, however, absent of or deficient in language-specific corpus.

In another aspect, systems may be configured to automatically learn and discover symptoms for a problem by analyzing unstructured data using "clues" of natural language and ontology of noun phrases associated with a feature of interest.

In yet another aspect of an apparatus and method for processing repair information, a knowledge system generates textual content about a possible solution by interpreting the meaning of a trouble description, repair request, or other repair information and applying domain-specific contextual information to return one or more recommended solutions.

In another aspect, an exemplary system may adapt to a specific enterprise by allowing expert to identify features of interest in enterprise data, automatically suggesting an appropriate learning algorithm, and creating a base learning model adapted to the enterprise.

In another aspect, a method is provided. A system for processing enterprise data interacts with a domain expert to define a domain model and captures a priori and a posteriori domain knowledge from the expert. The system translates the knowledge into the domain model. The model preferably includes machine learning strategy, a structured taxonomy of features and metadata associated with the domain. The system can extract and interpret textual inputs and/or numerical inputs from the data into multiple features of interest from the domain model, and apply contextual data and interpreted-feature data based on the structured taxonomy. The system can receive feedback from the expert to improve the model, which may include improving learning features of the model.

These as well as other aspects and advantages will become apparent to those of ordinary skill in the art by reading the following detailed description, with reference where appropriate to the accompanying drawings. Further, it should be understood that the embodiments described in this overview and elsewhere are intended to be examples only and do not necessarily limit the scope of the invention.

BRIEF DESCRIPTION OF THE DRAWINGS

Example embodiments are described herein with reference to the drawings.

Like reference numerals refer to the same or similar components throughout the several views of the drawings.

DESCRIPTION OF EMBODIMENTS

I. Overview

Figure 1:
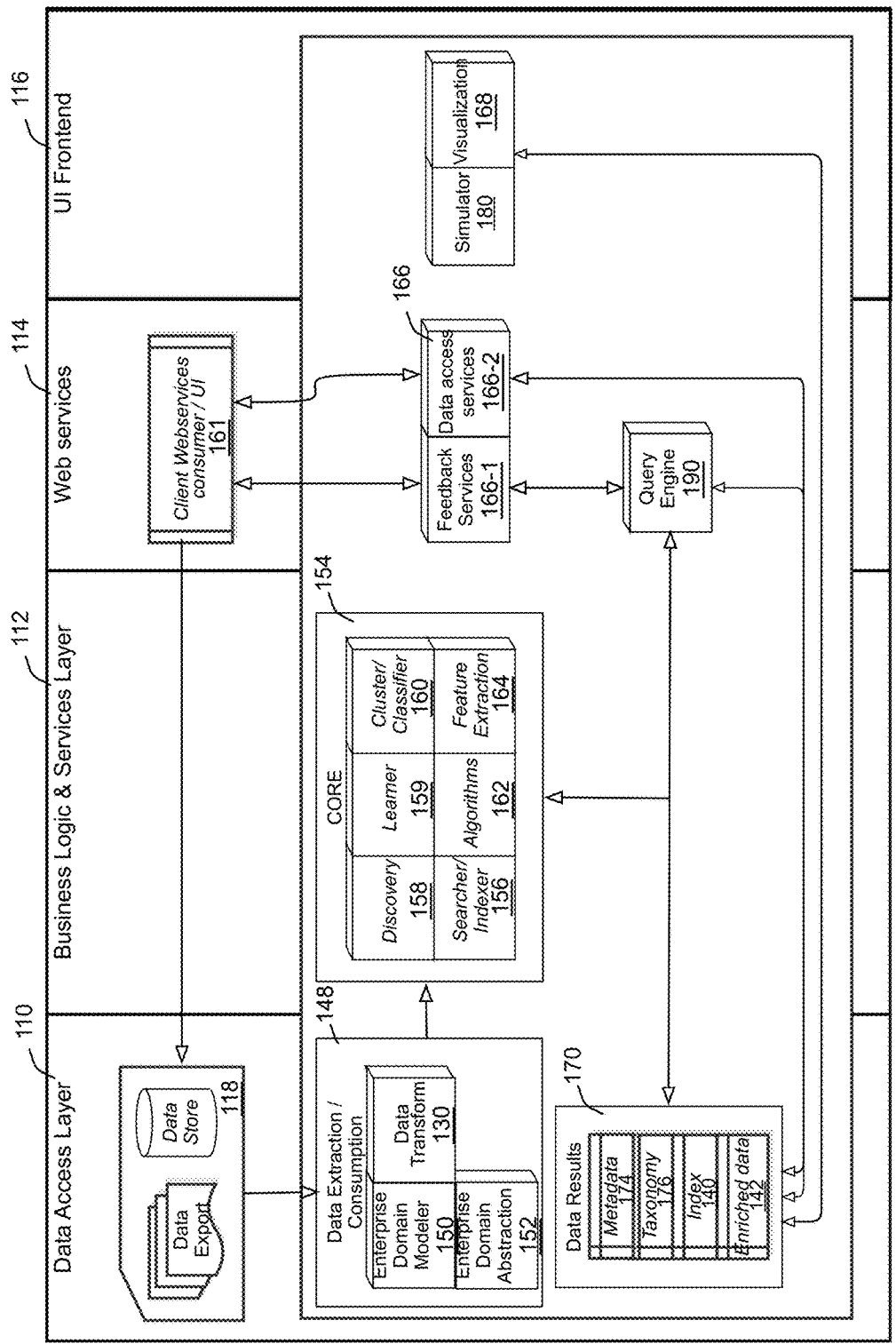
FIG. 1 is a schematic illustration of the architecture of a system for processing enterprise data in accordance with an example embodiment.

Described herein are adaptable machine learning systems and methods for processing and utilizing enterprise data. In the following description, for purposes of explanation, numerous examples and specific details are set forth in order to provide a thorough understanding of the aspects of the systems and methods. It will be evident, however, to one skilled in the art that the present invention as defined by the claims may include some or all of the features in these examples alone or in combination with other features described below, and may further include modifications and equivalents of the features and concepts described herein.

In some embodiments, a system, or platform, for processing enterprise data is configured to receive and analyze data from various data sources to create a domain-specific model and provide enriched results. The platform may include a data extraction and consumption (DEC) module to translate domain specific data into defined abstractions, breaking it down for consumption by a feature extraction engine. A core engine, which may include a number of machine learning modules, such as a feature extraction engine, a classifier and a clusterer, analyzes the data stream and stores metadata that may be used to produce and provide real-time query results to client systems via various interfaces. A learning engine incrementally and dynamically updates the training data for the machine learning by consuming and processing validation or feedback data. The platform includes a data viewer and a services layer that exposes the enriched data results. The platform is scalable to support a wide range of enterprise domain.

Diagnostic data is generated continuously for small to large devices and machines to enable troubleshooting and repair. As an implication, the service industry is heavily impacted by this turnaround time. The diagnostic tools used for troubleshooting generate large volume of information that can be analyzed using systems and methods described herein to assist in more effective troubleshooting. Some platform tools may be accessed by a customer (e.g., as in case of computers or information technology) or a non-domain expert engineer. This diagnostic information may come to the data center with human observations/analysis and so with human errors.

Historical analysis of data obtained from diagnostic tools or connected devices, e.g., using an instance clustering strategy, may facilitate identification of the most prominent data features and set of clusters. Each cluster may represent a defect, its cause and symptoms. This may further extended to recommend corrective action to be taken based on historical observations. Such a clustering strategy may utilize domain-specific feature extraction, which may include:

Regular Expression Extraction: Defining regular expression for identification of diagnostic codes which are generated by diagnostic devices.

Custom taxonomy feature extraction: Extracting the most common set of components associated with machine under consideration, and also the list of symptoms. Since the same component may be referenced using different terms, synonym lists are provided against these taxonomies.

Natural language process feature extraction: In case diagnostic data is edited by humans then often it would have further pointers towards cause and correction discussed using natural language. This may include extracting prominent verbs, nouns phrases and using them as a feature.

II. Example Architecture

Referring to FIG. 1, in some embodiments, a system 100 (also referred to herein as "Predii System", or "Platform", or "Natural Language Processor"), for processing and utilizing enterprise data may include a data access layer 110, a business logic and services layer 112, web services 114 and a user interface front end 116. In some embodiments, a data extraction and consumption (DEC) module 148 may be part of the data access layer 110.

Enterprise data 118 (e.g., from enterprise-specific data sources 294 and related contextual information from various other data sources 292 of FIG. 2), collectively referred to as enterprise data 118, may feed into a DEC module 148 of platform 100, as described in more detail below, for example with respect to FIG. 3. Imported data may include, for example domain model training data and test data for creating a domain model for processing enterprise-specific data. DEC module 148 may serve to map domain-specific data into abstract data models, and may include modules (each including instructions for performing steps of a process or method) for domain modeling 150, domain abstraction 152 and transforming data 130. Such instructions may be used to determine the model training parameters and data, the data to be tested, and the taxonomy from the domain data in order to feed data into the feature extraction capabilities 164 of core engine 154. DEC 148 may map data of interest (e.g., columns of interest from a database, properties of interest from a data model, etc.) into training and/or testing data sets. In some embodiments, data may be broken down into ENITY and ATTRIBUTES, based on the specific domain data, as described in more detail below with reference to FIG. 6. In some embodiments, this model may then be pushed into a shared queue (e.g., DATA_QUEUE) for further processing.

Based on the type of data stream the platform 100 will scale accordingly to produce messages for DATA_QUEUE. Data access services 166-2 provides an API or gateway to a from the System 100 to client web services 161, e.g., for transmitting queries from an enterprise connected device (e.g., 294-1, 294-2 of FIG. 2) and returning metadata or visualization data to the connected device(s). Support may include:

Text file such as csv exports

Databases (MySQL, Microsoft Sql Server, Mongo, etc.)

HTTP based services

Core engine 154 may be both a consumer of domain data and a producer of enriched results and metadata. Modules within core 154 may include searcher/indexer 156, discovery 158, cluster/classifier 160, algorithms 162, and feature extraction 164.

Feature extraction module 164 may be closely associated with a domain, and may include domain-specific feature extraction parameters, e.g., provided or configured by a domain expert. Certain feature extractor processes that may be implemented by Feature Extractor may include, for example, extraction of regular expression (RE) terms, taxonomy features, and natural language processor (NLP) features. These and other aspects of feature extraction module 164 are described in more detail below, for example with respect to FIG. 3.

Seacher/indexer 156 indexes data, including identifying key words grouping data for quick access by other processes of the system.

Discovery 158 seeks and identifies patterns in data. Such patterns may not be otherwise easy to detect as they may be obscured within large volumes of data or by the unstructured nature of enterprise data and/or spread across a number of variables.

Learner 159 may use the existing categorized data points from the enterprise to build a supervised learning model using the features extracted. This strategy may use a weighted classifier, such as a KNN classifier. In the learning process inverted term index is built with weights incorporated per feature of the entity.

Cluster/Classifier 160 may provide instructions for implementing a number of data classification and clustering strategies for processing enterprise data. Classification Module 160: The unclassified stream of data obtained from the enterprise data passes through feature extraction module 164 and then classified into the appropriate categories using the learning or discovery module 158. The data is compared against a control set for maintaining accuracy. The sample set may also reviewed by domain expert, and feedback from the domain expert, enterprise systems and additional data sources may be pushed to feedback services module 166-1 or otherwise added or reflected in the domain model or feature extraction parameters. Feedback obtained from a domain expert and/or an auto-control set is consumed back by feedback module, which reassigns the weights and relearns the classification model. This provided a constantly self-evolving ecosystem for the model to be consistent with the changing environment.

Algorithms 162 may include any desired machine learning algorithms to support the processing of enterprise data, of such as Lucene NN, Naive Bayes, SVM, and other known algorithms as applicable to the desired learning application.

In some embodiments, core engine 154 is a multi-threaded system that dynamically adjusts to the data load, scalable to address future requirements.

Core engine 154 interfaces with the data access layer 110 to persist enriched data via a share queue (DATA_RESULTS_QUEUE). Enriched data may include classified data, clustering information, discovered taxonomies, etc. Results data may include meta and trace data indicating the enrichment performed on the data, the enriched data, and identification data correlating back to the original data. The core 154 may act as a producer for the DATA_RESULTS_QUEUE shared queue.

The data results module 170 may be a part of the data access layer responsible for persisting enriched data. Data results may include metadata (data about data) 174, taxonomy 176, indexed data 140, and/or enriched data 142. Data results 170 may be consumed as acknowledged messages from DATA_RESULTS_QUEUE shared queue.

Data results 170 may be transformed based on implementation specific to an export requested. Data models may persisted as, for example, database objects, j son objects, xml objects, or flat file records.

Based on the type of data results requested, the platform 100 may scale accordingly to consume messages and persist. Support may include:

Text file such as csv exports
Databases (MySQL, Microsoft Sql Server, Mongo, etc.)
HTTP based services The API services 114 (also referred to as Web services 114) exposed by the platform 100, which may include services 166, such as feedback services 166-1 and data access services 166-2, may provide a means for client applications 160 to interface with enriched data from the System 100. The API services 114 exposed may be REST based over HTTPS, and may utilize authentication and/or authorization paradigms. The content media types may include XML, JSON and plain text, or other suitable media types.

The viewers and visualization module 168 may correlate the raw original domain data with the enriched data. Each viewer may provide as mechanism to export the current views. Viewers may include a classification viewer <#> and a cluster viewer <#>.

Classification viewer shows how the core module 154 utilized machine learning to classify the domain data. It can reveal the original input, the entity and attributes extracted, the meta and trace information, and the training data in which the particular entity was classified into. This viewer may offer filters as a means to partition and query the data.

A cluster viewer may show how the core module 154 utilized machine learning to group the domain data into logical clusters. It can reveal the original input, the entity and attributes extracted, the meta and trace information, and the cluster in which the particular entity was grouped. This viewer may offer filters as a means to partition and query the data.

In some embodiments, an analytics and reporting view of the data, e.g., using visualization 168 to configure data for viewing within dashboard 286 (e.g., see FIG. 2), may provide general statistical analysis of the original domain data, and the totals for the enriched data. Such a module may provide reporting capabilities on the enriched data with respect to time.

A feedback module 166-1 may provide a gateway back into the core module 154 to dynamically train and enhance the domain data by updating the taxonomies and feature extraction process. This feature allows the incremental update of the domain training data based on validation information, taxonomy updates, algorithm priorities, and general use cases that will affect the identification of entity attributes. The feedback services is part of the API services layer that impacts the underlying meta data, instead of reading and retrieving enriched data as other viewers.

Simulator 180 may provide a simulation interface, e.g., accessible via a user interface 116 that allows a user to simulate and test new updates to the training set utilizing a small sample of the dataset.

Figure 2:
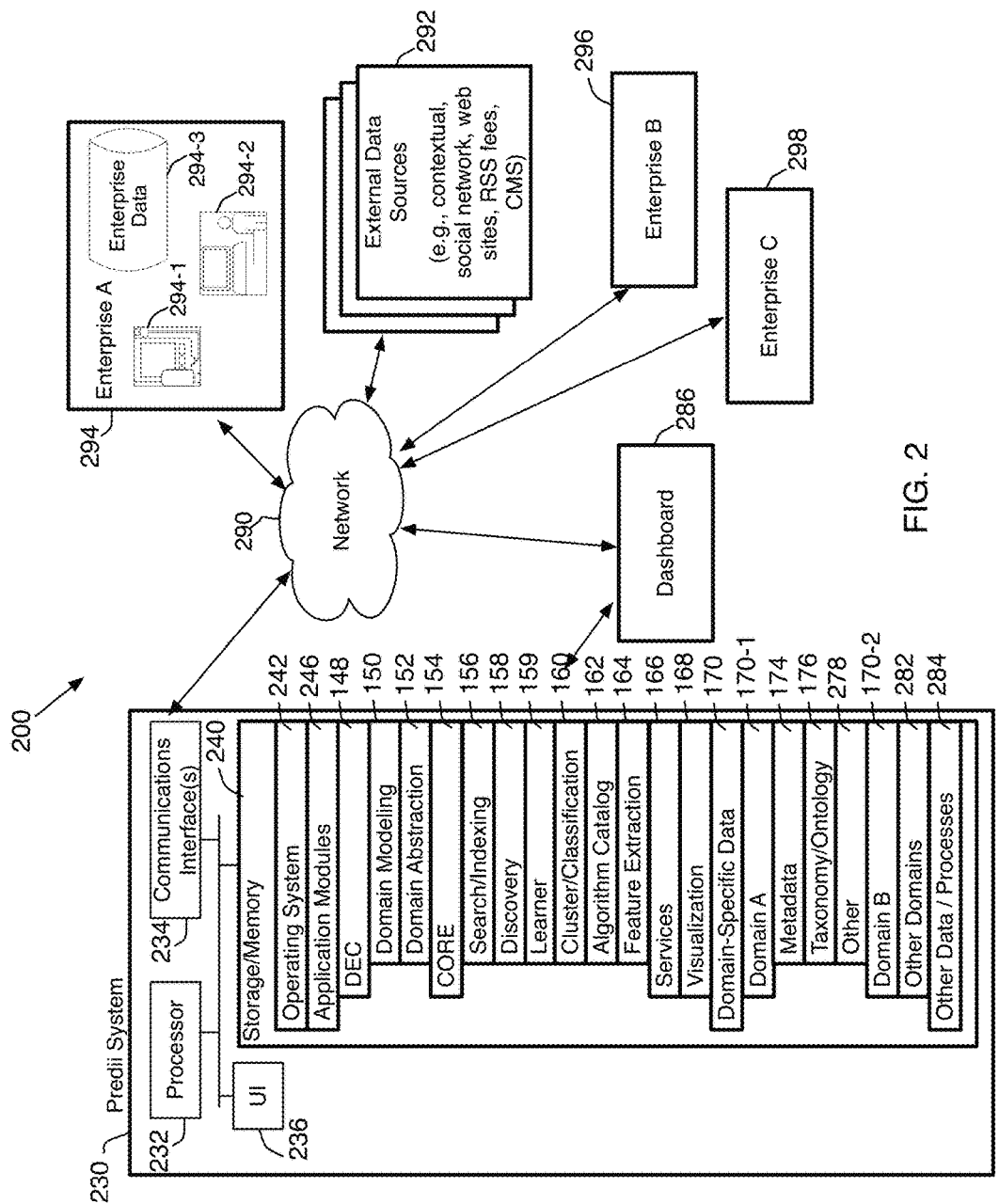
FIG. 2 is a schematic illustration of the platform of FIG. 1 in accordance with an example embodiment.

Referring to FIG. 2, in some embodiments, a system 200 for processing and utilizing enterprise data may include platform 100, which may communicate over a network 290 with one or more enterprise systems 294, 296, 28 and external data sources 292 (including web sites, social networking sites, and contextual databases). Platform 100 may be used to model data from an enterprise (e.g., enterprise data 294-3) into features applicable to enterprise context and uses the model to drive classification and clustering of data. Enterprise context may be, for example, repair orders, service orders, repair data, customer transactional data, server performance data, or any other data applicable to an enterprise.

Platform 100 may be embodied in a server system 230 as shown in FIG. 2, or may comprise multiple distributed servers or cloud-based servers or services. In an exemplary embodiment, system 230 includes at least one processor or central processing unit (CPU) 232, a user interface module 236, and a communication or network interface 234 for communicating with other computers or systems over a network 290, and data storage 240, all of which may be physically and/or communicatively linked together via a system bus, network, or other connection mechanism.

Generally, user interface module 236 is configured to send data to and/or receive data from external user input/output devices. For example, user interface module 236 can be configured to send and/or receive data to and/or from user input devices such as a keyboard, a keypad, a touch screen, a computer mouse, a track ball, a joystick, a camera, a voice recognition module, and/or other similar devices. User interface module 236 can also be configured to provide output to user display devices, such as one or more cathode ray tubes (CRT), liquid crystal displays (LCD), light emitting diodes (LEDs), displays using digital light processing (DLP) technology, printers, light bulbs, and/or other similar devices, either now known or later developed. User interface module 236 can also be configured generate audible output(s) through device(s) such as a speaker, speaker jack, audio output port, audio output device, earphones, telephone ringers, and/or other similar devices. In some embodiments, user interface module 236 can be configured to provide haptic and/or tactile feedback using one or more vibration devices, tactile sensors, actuators including haptic actuators, tactile touchpads, piezo-haptic devices, piezo-haptic drivers, and/or other similar devices.

Communications interface 234 can include one or more wired or wireless interfaces that are configurable to communicate via a network, such as network 290. Wireless interfaces can include one or more wireless transmitters, receivers, and/or transceivers, such as a Bluetooth transceiver, a Zigbee transceiver, a Wi-Fi transceiver, a WiMAX transceiver, and/or other similar type of wireless transceiver configurable to communicate via a wireless network. Wired interfaces can include one or more wireline transmitters, receivers, and/or transceivers, such as an Ethernet transceiver, a Universal Serial Bus (USB) transceiver, or similar transceiver configurable to communicate via a twisted pair wire, a coaxial cable, a fiber-optic link, or a similar physical connection to a wired network.

Processor 232 can include one or more general purpose processors and/or one or more special purpose processors (e.g., digital signal processors, application specific integrated circuits, etc.). Processors 232 can be configured to execute computer-readable program instructions (e.g., instructions within application modules 246) that are stored in memory 240 and/or other instructions as described herein.

Memory 240 can include one or more computer-readable storage media that can be read and/or accessed by at least one of processors 232. The one or more computer-readable storage media can include volatile and/or non-volatile storage components, such as optical, magnetic, organic or other memory or disc storage, which can be integrated in whole or in part with at least one of processors 232. In some embodiments, data storage 240 can be implemented using a single physical device (e.g., one optical, magnetic, organic or other memory or disc storage unit), while in other embodiments, data storage 240 can be implemented using two or more physical devices.

Memory 240 can include computer-readable program instructions, e.g., an operating system 422, application modules 246, and databases such as domain-specific databases 170 (including data related to specific domains 170-1, 170-2) and other data or databases 282, 284. In some embodiments, memory 240 can additionally include storage required to perform at least part of the herein-described methods and techniques and/or at least part of the functionality of the herein-described devices and networks.

Memory 240 may include high-speed random access memory (RAM) and/or non-volatile memory, such as one or more magnetic disc storage devices. Memory 240 may store an operating system (or set of instructions) 242, such as LINUX, UNIX, MAC OS, or WINDOWS, that includes procedures for handling basic system services and for performing hardware independent tasks. Memory 240 may also store information, application modules 246, domain-specific data 170 and other data, databases and/or process instructions 284.

Platform application modules 246 may include a data extraction and consumption (DEC) module 148, core engine (core) 154, services 166, and a visualization module 168. DEC module 148 may include software routines and other instructions for domain modeling 150 and domain training 152, e.g., for creating a domain model for analyzing, processing and presenting enterprise data as described in more detail below. Core engine 154 may include instructions for searching and indexing 156, a learner module 158, a discovery module 158, a cluster/classification module 160, machine learning algorithms 162, and feature extraction 164. Services 166 may include web services or application program interfaces (API) for sending information to and receiving information from external systems such as enterprises 294, 296 and 298. Visualization module 168 may be used to format and package data and other information for display to end users. As used herein, a module refers to routine, a subsystem, set of instructions, or other actual or conceptual functional unit, whether implemented in hardware, software, firmware or some combination thereof.

Enterprises 294, 296, 298 may be any business or other enterprise utilizing the system 100 to analyze and process domain data relevant to the enterprise. In embodiments described herein, system 100 may be used for a variety of different service repair enterprises having information concerning problem reporting, diagnoses, repair and service recommendations, including, for example, in automotive and other vehicles, healthcare, home appliances, electronics, information technology and aeronautics. Each enterprise, e.g., Enterprise 294, may utilize a number of different connected devices to communicate with the system server 230, including connected mobile devices 294-1 (e.g., handheld diagnostic equipment, smart phones, tablet computers, or other portable communication devices), computer systems 294-2 (e.g., customer/business laptop or desktop systems, POS systems, service desk systems, etc.), and enterprise data stores 294-3, e.g. for storing and/or managing enterprise data.

A dashboard 286 or other administration system may provide a user interface and administration tools for configuring the system 100, 230, modeling a domain, presenting visualization data, collecting and/or applying feedback from domain experts, configuring and/or monitoring classification and clustering processes, configuring other processes, and setting desired parameters and monitoring system function.

Figure 3:
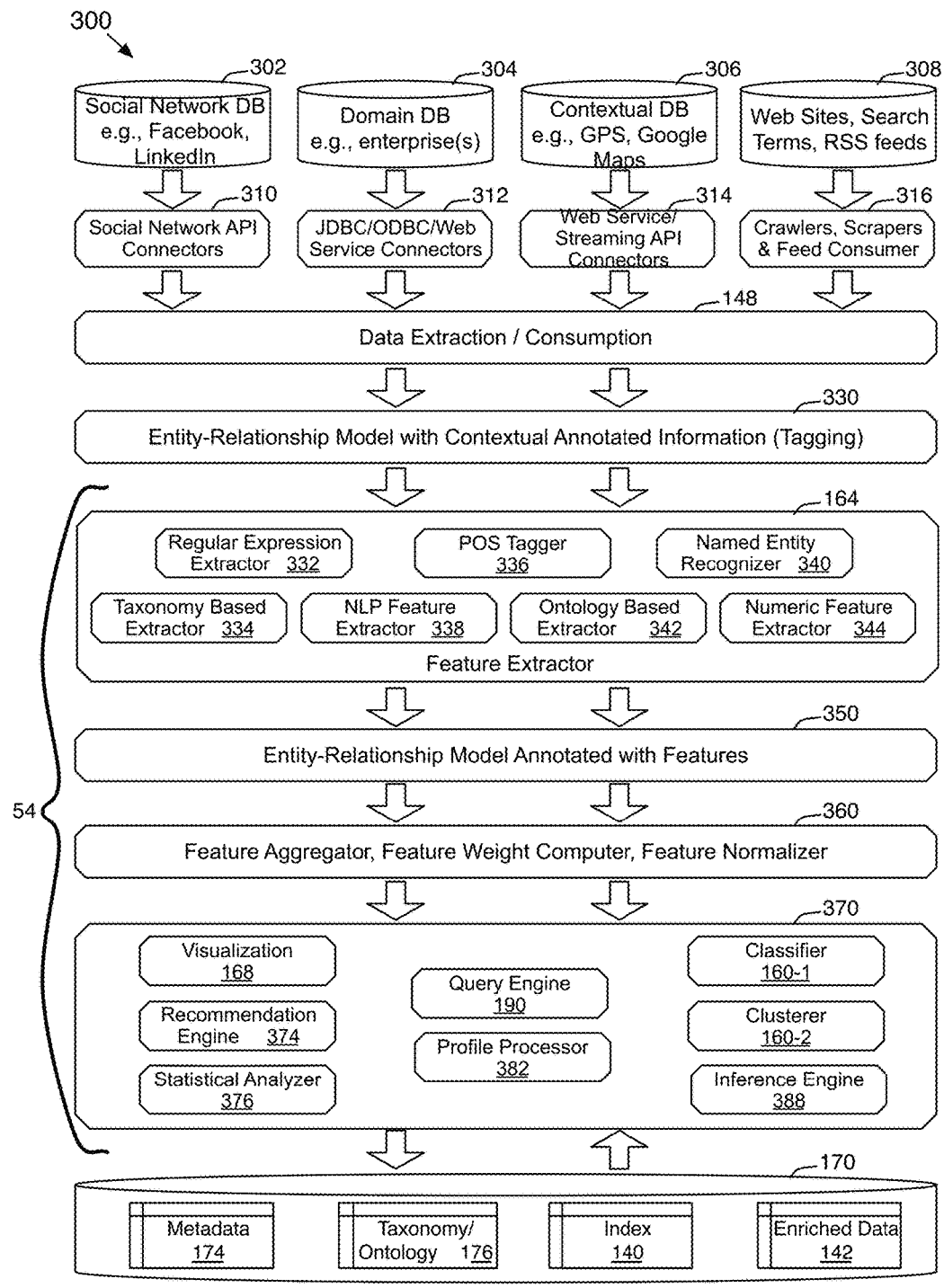
FIG. 3 is a flow diagram illustrating features of a platform for processing enterprise data in accordance with an example embodiment.

FIG. 3 is a schematic diagram of a functional architecture 300 or relationships of features of a system for processing enterprise data such as System 100 of FIGS. 1 and 2. In the following embodiment, features of the system may be described, by way of example, in use for an enterprise in the automotive service domain. One skilled in the art will appreciate that the features and principles of the system are adaptable to various other domains and enterprises, including, without limitation, healthcare, information technology, home appliance repair, aeronautics, and other service-based or information-rich enterprises in any desired domain.

Data extraction/consumption module (DEC) 148 may receive data from a variety of data sources, such as one or more social network databases 302, domain databases 304, contextual databases 306 and web sites, keyword searches, or RSS feeds 308 sources. Each of these data sources 302, 304, 306, and 308 may communicate with DEC 148 via a corresponding input module 310, 312, 314, and 316, respectively. Domain databases 304 may provide enterprise-specific information, records and other data regarding a particular enterprise (also referred to herein as experienced-based information). Such enterprise-specific information may relate to, for example, customers, transactions, support requests, products, parts, trouble codes, diagnostic codes, repair or service information, and financial data. In an embodiment for processing automotive service information, for example, domain DB 304 may comprise automotive service records, service orders, vehicle diagnostic information, or other historical or experience-based service information. This information may be received by the DEC module 148 via a web service API 312, e.g., a Java database connectivity (JDVC), open database connectivity (ODBC), or any other API or connection means. In other embodiments, enterprise data or broader domain information may be loaded into the system or read from computer-readable storage media connected to or otherwise in communication with System 100.

Contextual databases 306 may be any relevant information sources that drive context to the domain or enterprise data. For example, connections to sites such as Google Maps may provide location information, other sites or databases may provide data regarding weather, GPS or other location coordinate information, elevation, date and time, or any other information that may be useful to provide context to enterprise-specific data. For example, in an automotive service example, map or other location data may be used along with automotive service records and other enterprise data to identify and display common problems associated with a particular service location or to identify region-specific problems or trends.

In some embodiments, social network databases 302 may include Facebook, Twitter, LinkedIn, and the like, and may be accessible by DEC 148 via applicable API connectors 310. Data from social network databases 302 may be used to understand key "features" to help drive learning, create a domain model, and/or process a query. Similarly, information from web sites, site search terms, RSS feeds, and other external information sources may be obtained by the DEC 148 via web crawlers scrapers, feed consumers and other applicable means 316.

Figure 6:
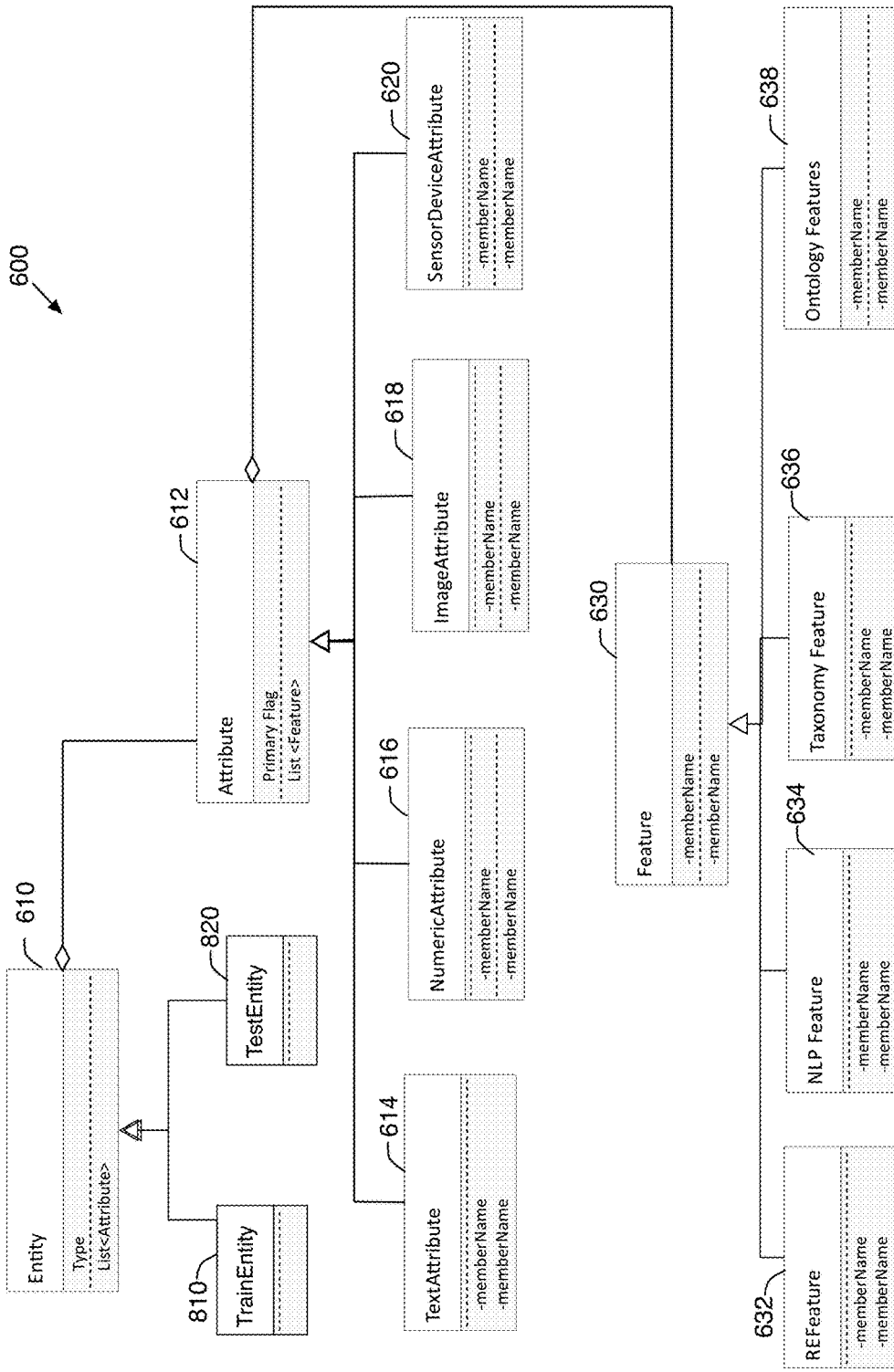
FIG. 6 is a class diagram of an enterprise data model abstraction for machine learning, in accordance with an example embodiment.
Figure 7:
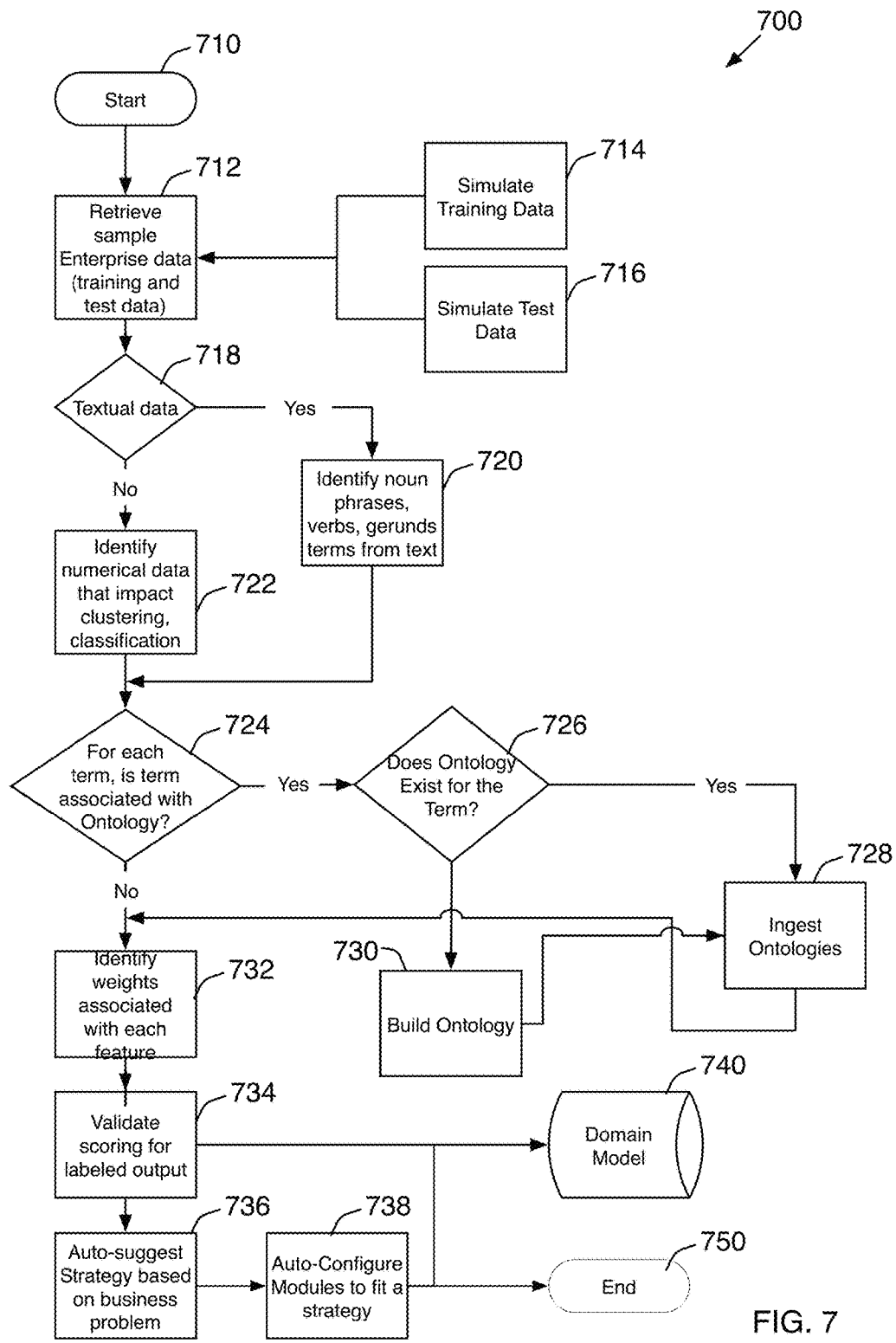
FIG. 7 is a flow chart of a method for creating a domain model, in accordance with an example embodiment.

Enterprise-specific records and other information from databases 302, 304, 306 and 308 may be in any form or format, including structured or unstructured data, textual or numeric, natural language, or informal broken sentences or collections of words and/or numbers (e.g., gibberish). DEC 148 may use such information from the domain DB 304, as well as contextual or potentially related information from other sources 302, 306, 308 to create an abstraction of data relevant to the enterprise (e.g., using enterprise domain abstraction 152 of FIGS. 1 and 2) and build an entity-relationship model, also referred to herein as a "domain model" with contextual annotated information 330 (e.g., using domain modeler 150 of FIGS. 1 and 2). An exemplary enterprise domain abstraction process 600 is illustrated in FIG. 6 and an exemplary process for creating a domain model 700 is illustrated in FIG. 7, each of which are described in more detail below with reference to their respective figures.

In this embodiment, the entity-relationship model with contextual annotated information 330 may feed into feature extractor 164 of core 154, which may be used to process core 154, which may extract key features from model 330 for further processing by aspects of core 154.

In some embodiments, feature extractor 164, may include a regular expression extractor 332, a taxonomy based extractor 334, a POS tagger 336, an NLP extractor 338, a name entity recognizer 340, an ontology based extractor 342, and a numeric feature extractor 344.

Regular expression (RE) extractor 332 may be used to extract enterprise-specific features that follow a specific pattern, such as symbols, registration numbers, item codes, product codes, or service codes. Such features may be extracted for every attribute of a desired entity.

Taxonomy based extractor 334 may be customized to extract domain-specific data points, such as product names, service listing, or any taxonomy relevant to the business. Domain-specific synonym lists can also be provided for wider searches. This may also include looking for spelling variations, abbreviations, and/or other common features of terms. In a repair service industry application, custom taxonomy can include names of the most common set of components and other terms associated with the machine, device or service under consideration (e.g., an automobile). Since the same component may be referenced using different terms, synonym lists are provided against these taxonomies.

In an automotive enterprise example, extractor 334 can be configured to identify a taxonomy term that matches a term within vehicle-service data, such as from a vehicle repair order (RO). A term in a taxonomy of terms or a term within the vehicle-service data can include one or more words, abbreviations, acronyms, or numbers, or some other portion of a natural language that can be classified as a term. A term in a taxonomy can be designated as a standard term. One or more non-standard terms can be associated with a standard term. A non-standard term can be a synonym, an abbreviation, or alternative spelling of its associated standard term. Alternative spellings can include misspelled terms.

In the vehicle-service data example, a number of taxonomies may be employed, such as for example taxonomies for: (a) labor terms, e.g., remove, replace, adjust, lubricate, clean, refinish, repair, splice, solder, connect, reconnect, fill, drain, balance, and inspect; (b) vehicle part names, e.g., alternator, oxygen sensor, engine, oil filter, manifold gasket, or any other vehicle part name; (c) symptom terms, e.g., stalls, dies, hot, cold, or some other term that describes a symptom that can be exhibited by a vehicle; (d) part failure mode terms, e.g., leaky, broken, missing, bent, etc. Any other desired taxonomies may be defined or learned and implemented in the system, depending upon the desired application.

A POS tagger 336 may be used to identify and extract features from data based on the relative positions of specified words or phrases. For example, specified terms can be tagged or extracted if they appear within a defined number of words of another associated term, e.g., if "gasket" appears within 5 words of "manifold".

NLP extractor 338 provides identification of verbs, nouns and phrases that are used to describe terms in the taxonomies, and other terminology that may be important, common or standard to the particular enterprise or business.

Name entity recognizer 340 may be used to identify certain terms or variations of terms within text or other data. Numeric feature extractor 344 may be employed to identify and extract relevant numbers or other quantitative information from data, records or other information.

Ontology based extractor 342 may identify in text information or other data relevant concepts, properties, and relationships expressed in an ontology relevant to the enterprise. Ontologies are typically developed by a domain expert and may include enterprise-specific concepts arranged in class/sub-class hierarchies, similar to taxonomy. Ontology is typically a broader or more abstract expression of hierarchical relationships than taxonomy.

The foregoing aspects of feature extractor 164 work together to identify and extract features and generate an entity-relationship module annotated with features 350, to which may be applied a feature aggregator, feature weight computer, and/or a feature normalizer 360 to further process the information within core 154.

A set of machine learning tools 370 within core engine 154, may further process the aggregated, weighted and normalized enterprise data from 360. Such tools and processes may include visualization engine 168, recommendation engine 374, statistical analyzer 376, query engine 290, classifier 160-1, clusterer 160-2, a profile processor 382, and an inference engine 388.

Visualization is described in more detail below with respect to FIG. 14. Recommendation engine (RE) 374 processes classified data coming out of Classification 160-1 and uses the scoring appropriate for the given enterprise data and recommends the most appropriate class or group. For example, for a given repair request, there can existing top five possible repair solutions based on the score. However, one of the top five might be most appropriate for a given scenario and based on the feedback received from the past learning. RE 374 applies the learning, score and classification results and recommends the most appropriate solution.

Statistical Analyzer 376 computes statistical parameters over a set of features as specified. The statistical results can be used for getting insight into the enterprise data and as well for generating visualization, e.g., on the dashboard 286.

For example, the most high frequency component associated with a given repair can be computed using statistical analyzer 376 by looking for absolute highest frequency, average, statistically significant (e.g., p-value), distribution curves.

Query engine 190 utilizes feedback services 166 to respond requests coming from external applications within an enterprise, e.g., from connected devices 294-1, user terminals 294-2, or other connected computer systems within an enterprise. Query engine 190 is capable of interpreting a request in progress in real time and anticipating follow-on requests to providing a most appropriate response by applying context of the given request, applying past learning, and providing a response.

For example, an end-user of an enterprise shop repair application (e.g., an automotive service technician) may enter, e.g., using a computer terminal in the shop, a customer request to repair a device. The request is communicated to query engine 190 via access services 166. Query engine will interpret the request and communicate with core 154 and stored data 170 to provide a response based on the past millions or billions of enterprise repair requests, including providing the most appropriate repair solution(s). If a solution does not exist, System 100 may utilize such information for further learning, e.g., by automatically clustering the current request into a "requires solution" category.

Outputs from these core 154 processes may include metadata 174, taxonomy/ontology data 176, indexed information 140, and enriched data 142, as described above. This information may be used and applied to produce results, recommendations, and other information in response to queries, e.g., from connected devices 294-1 or service technicians or other end-user systems 294-2 in an enterprise 294.

Additional details regarding exemplary classification and clustering strategies using the system of FIGS. 1-3 follow:

Classification Strategies

Classification may be utilized to solve item categorization problems for enterprises having a large number of instances, or data records, such that it would be desirable to classify data into on of the several categories. The number of categories may be on the order of tens of thousands or more. In some embodiments, a classification strategy may include one or more of the following features or modules:

1. Importer module (DEC module) 148: An importer module may be used to convert an enterprise object to be classified into an entity. Such conversion entails joining data across database tables and pulling data from various enterprise sources.

2. Feature Extraction Module 164: Feature extraction modules are closely associated with domain. Therefore, irrespective of the strategy, this module can be extended by adding domain-specific feature extraction capabilities. Some of the default feature extractor processes used in the strategy may include:

Regular Expression Extractor 332: Used to extract enterprise-specific codes such as registration numbers, item codes, product codes, or service codes. Such codes may be extracted for every attribute of the entity.

Custom Taxonomy Feature Extractor 334: This taxonomy may include domain-specific data points, such as product names, service listing, or any taxonomy relevant to the business. Domain-specific synonym lists can also be provided for wider searches. This may also include looking for spelling variations, abbreviations, and/or other common features of terms.

Natural Language Processor (NLP) Feature Extractor 338: The NLP Feature Extractor provides identification of verbs, nouns and phrases that are used to describe terms in the taxonomies, and other terminology that may be important, common or standard to the particular enterprise or business.

3. Learning Module 159, Supervised: May use existing categorized data points from the enterprise to build a supervised learning model using the feature extracted above. This strategy may use a weighted classifier, such as a KNN classifier. In the learning process inverted term index is built with weights incorporated per feature of the entity.

4. Classification Module 160: The unclassified stream of data obtained from the enterprise data passes through feature extraction module 164 and then classified into the appropriate categories using the learning or discovery module 158. The data is compared against a control set for maintaining accuracy. The sample set is also reviewed by domain expert and the feedback is pushed to a feedback module <#>.

5. Feedback Module 166-1: Feedback obtained form the domain expert and the auto-control set is consumed back by feedback module, which reassigns the weights and relearns the classification model. This provided a constantly self-evolving ecosystem for the model to be consistent with the changing environment.

6. Scoring Module: A post-processing module (e.g., module 415 using rules 440) for this strategy is scoring of enterprise objects defining the affinity towards a particular class. Scoring is the function of the common set of features found in enterprise object and the enterprise category.

7. Export Module: Export module may be used to normalize Entity into an enterprise object and pushes it back via a web service call.

Clustering Strategy:

This strategy is utilized for solving item clustering problems for enterprises where there are large number of instances and can be clustered into several categories. As with the classification strategy described above, the number of categories may be on the order of tens of thousands or more.

In some embodiments, clustering strategy may include one or more of the following building modules:

1. Importer module (DEC module) 148: An importer module may be used to convert an enterprise object to be classified into an entity. Such conversion entails joining data across database tables and pulling data from various enterprise sources.

2. Feature Extraction Module 164: Feature extraction modules may be closely associated with domain. Therefore, irrespective of the strategy, this module can be extended by adding domain-specific feature extraction capabilities. Some of the default feature extractor processes used in the strategy may include:

Regular Expression Extractor 332: Used to extract enterprise-specific codes such as registration numbers, item codes, product codes, or service codes. Such codes may be extracted for every attribute of the entity.

Custom Taxonomy Feature Extractor 334: This taxonomy may include domain-specific data points, such as product names, service listing, or any taxonomy relevant to the business. Domain-specific synonym lists can also be provided for wider searches. This may also include looking for spelling variations, abbreviations, and/or other common features of terms.

NLP Feature Extractor 338: The NLP Feature Extractor provides identification of verbs, nouns and phrases that are used to describe terms in the taxonomies, and other terminology that may be important, common or standard to the particular enterprise or business.

3. Learning Module 159, Unsupervised: Canopy clustering is used to segregate entities based on primary set of features and for each of the primary clusters are passes through K-Means clustering algorithm to obtain finer clustering entities. Canopy clustering enables reduction in the complexity of the problem and improves computational performance without loss of accuracy. The finer clusters are large is number and hence we auto label each of the clusters based on the affinity of features to that cluster.

4. Post-processing: Cluster post-processing may also be performed, including merging of smaller clusters and filtering out of irrelevant clusters. The cluster groups are then ordered based on their importance.

5. Export Module: An export module may share the information about the newly discovered categories with the enterprise data store, e.g., via web services 166-2. It also exports the item-cluster mapping. Core 154 is consumer of the DATA_QUEUE. Messages taken from this queue may describe the source domain, entity, attributes of the entity and a command indicating the machine learning logic to be performed. This may include feature extraction, indexing, analyzing, classification, clustering, and supervised/unsupervised learning algorithms built into platform 30.

III. Example Methods of Processing Enterprise Data

Figure 4:
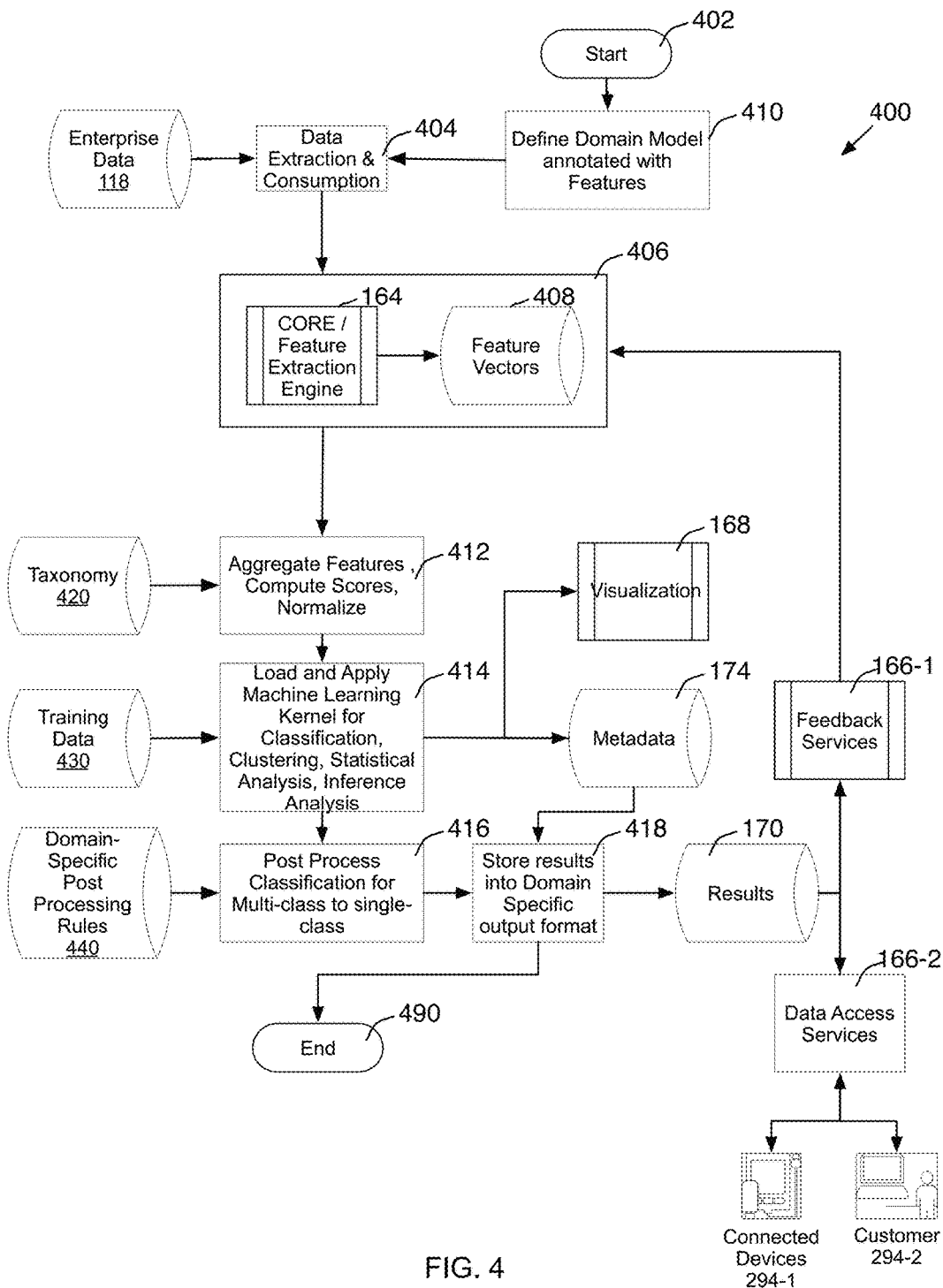
FIG. 4 is a flow chart of a method for processing enterprise data, in accordance with an example embodiment.

Referring to FIG. 4 an exemplary method 400 for processing enterprise data using the System 100 and features of FIGS. 1-3 is shown. In this example, the method 400 starts 402 with defining a domain model with annotated features 410 for the domain applicable to the enterprise data 118 to be processed (e.g., as described above with respect to FIG. 3 and discussed in more detail below with respect to FIGS. 15 and 16). Next is data extraction and consumption 404 (e.g., by DEC 148 of FIGS. 1 and 2) of the enterprise data 118. Data extraction and consumption may serve to extract and map data of interest, e.g., into entity and attributes based on the specific domain data. Data then may be processed 406 in the core 154, e.g., by feature extractor 164 to extract features from the data and create feature vectors 408.

In step 412, features may be aggregated, scored or ranked, and normalized as desired, e.g., using taxonomy data 420 applicable to the enterprise or domain. In 414, the processed data is then loaded and machine learning modules of core 154 (e.g., using training data 430) are applied for classification, clustering, statistical analysis, inference analysis, etc. The output of machine learning processes 414 may include metadata 174, which may be used by visualization engine 168, e.g., for display on dashboard 286, or may be stored 418 into domain-specific output format 418, e.g., in results store 170. Alternatively, processed data from 414 may undergo post-process classification 416 for multi-class to single-class data, e.g., using domain-specific post processing rules 440, and be stored as results into domain-specific output format 418. For example, such post-processing may involve determining the top five solutions or query answers, possibly with additional ranking, weighting or scoring information Such results may be accessed or used in response to a query, for example, from a connected device 294-1 or other customer system 294-2 in communication with the System 100, e.g., via data access services 166-2. Feedback services 166-1 may be associated with a query engine 190 (of FIG. 1). As described herein, such query or feedback may be fed back into core 154 and processed in 406 to improve learning of the system, or to process a user query and return relevant information.

Figure 5:
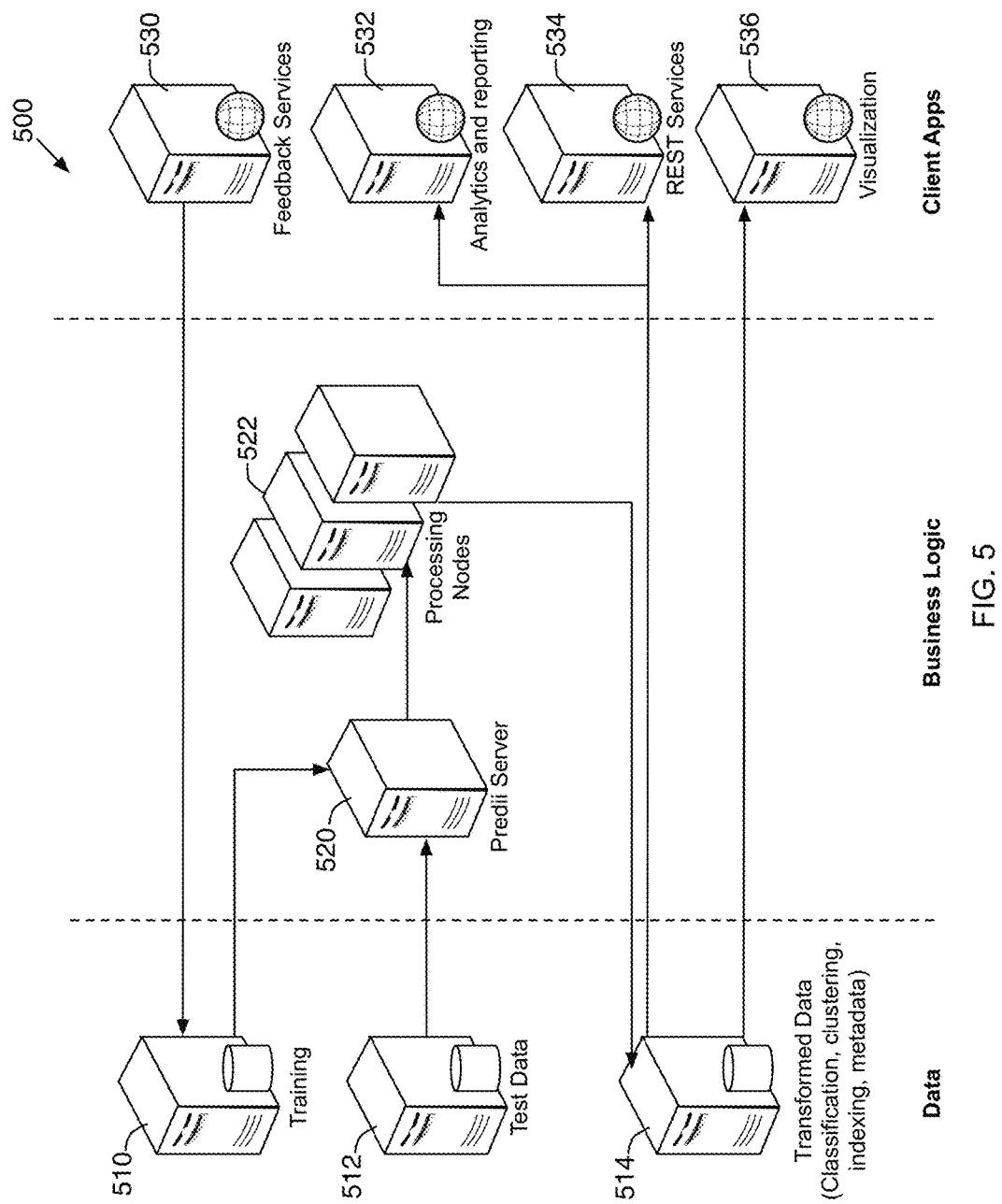
FIG. 5 is a schematic illustration of a system architecture, in accordance with an example embodiment.

As shown in FIG. 5, another embodiment of an adaptable system 500 for processing enterprise data may comprise a distributed architecture of servers and/or services. Server 520 may be similar to platform server 230, and may utilize one or more processing nodes 522 to process enterprise data, e.g., utilizing core engine 154 and associated modules. Data stored and/or utilized by system 500 may include training data 510, test data 512, and transformed data. 514. Applications for communicating with clients and customers, including, for example repair services providers, includes feedback services 530, analytics and reporting 532, REST services 534, and visualization 536.

IV. Enterprise Domain Abstraction

FIG. 6 is an entity model class diagram of a data model abstraction 600 for machine learning. Enterprise solutions commonly represent their data in-terms of entities and association among these entities via relationships ("ER-representations"). For convenience, the term "entity" is used similarly herein to define any instance of interest. As used herein:

Entity 610 may represent any enterprise object of analytical interest. To distinguishing between different types of entities each entity object has a type and characteristics of the instance of this object is defined via entity attributes 612. Types of entity 610 may include TrainEntity 810 (corresponding to training data) and TestEntity 820.

Attribute 612 may represent entity characteristic and can be defined using various types of attribute or representations, such as text attributes 614 or textual content, numeric attributes 616, image attributes 618, sensor devices 620, or even customized attributes. Attribute 612 value could be static as in case of text 614 and images 618 or can as well be streaming if coming from Sensory devices 620 or other external sources.

A "feature" 630 may be associated with an attribute, and can be defined as a data point or other information that is extracted out of such attribute content by applying desired transformations. An array of transformations can be applied on the same attribute to extract different facets. Features that may be of particular interest for the system framework as it contributes towards all the supervised, unsupervised and statistical analytics. It is also used in building the Visualization and Reporting framework. Features may include RE features 632, NLP features 634, taxonomy features 636, and ontology features 638.

V. Domain Knowledge Modeling

FIG. 7 is a flow chart of a method 700 for creating a domain knowledge model, in accordance with an example embodiment of an adaptable system for processing enterprise information. The method may be implemented, for example, in system 200 of FIG. 2 via a user interface dashboard 286 by a domain expert or other administrative user with access to platform server 230.

Following the start 710 of the process, sample enterprise data is retrieved 712, e.g., training data and test data. Such training and test data may be retrieved, for example, from enterprise data 118 of FIG. 1 and may provide enterprise-specific information, records and other data regarding a particular enterprise. Such enterprise data information may relate to, for example, customers, transactions, support requests, products, parts, trouble codes, diagnostic codes, repair or service information, or financial data. In the above-described embodiment for processing automotive service information, for example, the enterprise data retrieved in 712 may comprise automotive service records, service orders, vehicle diagnostic information, or other historical or experience-based service information. In process 700, a domain expert or other user may also provide parameters and data to simulate training data 714 and simulate test data 716 in order to aid in building a domain model.

If a retrieved sample of enterprise data from 712 is textual data 718, the system identifies noun phrases, verbs, and gerund terms from the text in 720. If the determination in 718 is that a sample of enterprise data is not entirely textual, numerical data that may impact clustering and classification are identified 722.

Each identified term from 720, 722 is analyzed to determine if such term is associated with ontology 724, and if so, whether the ontology already exists in the system for that term 726. As used herein, "ontology" refers to a hierarchical representation of known terms for the enterprise. For identified ontologies that already exist, such ontologies are ingested 728. Ontologies that are identified but not existing in the system are built 730 and then ingested 728. For each identified term with an ingested ontology, and for each term that is not associated with an ontology in 724, weights associated with each feature are identified 732 and scoring is validated 734 for labeled output.

From the identified, weighted, and validated output features, the domain model is created and stored 740. In some embodiments, method 700 may also include processes for easily adapting to different enterprises, including automatically suggesting 736 a processing strategy based on a presented business problem, e.g., using known business problems and associated features and adapting them to the particular enterprise or use case. Processing modules (e.g., modules of core 154) may then be auto-configured 738 to fit the suggested strategy, and the modules or associated parameters may then be incorporated into the stored domain model 740. Once the domain model is completed, the process may end 750.

Figure 17:
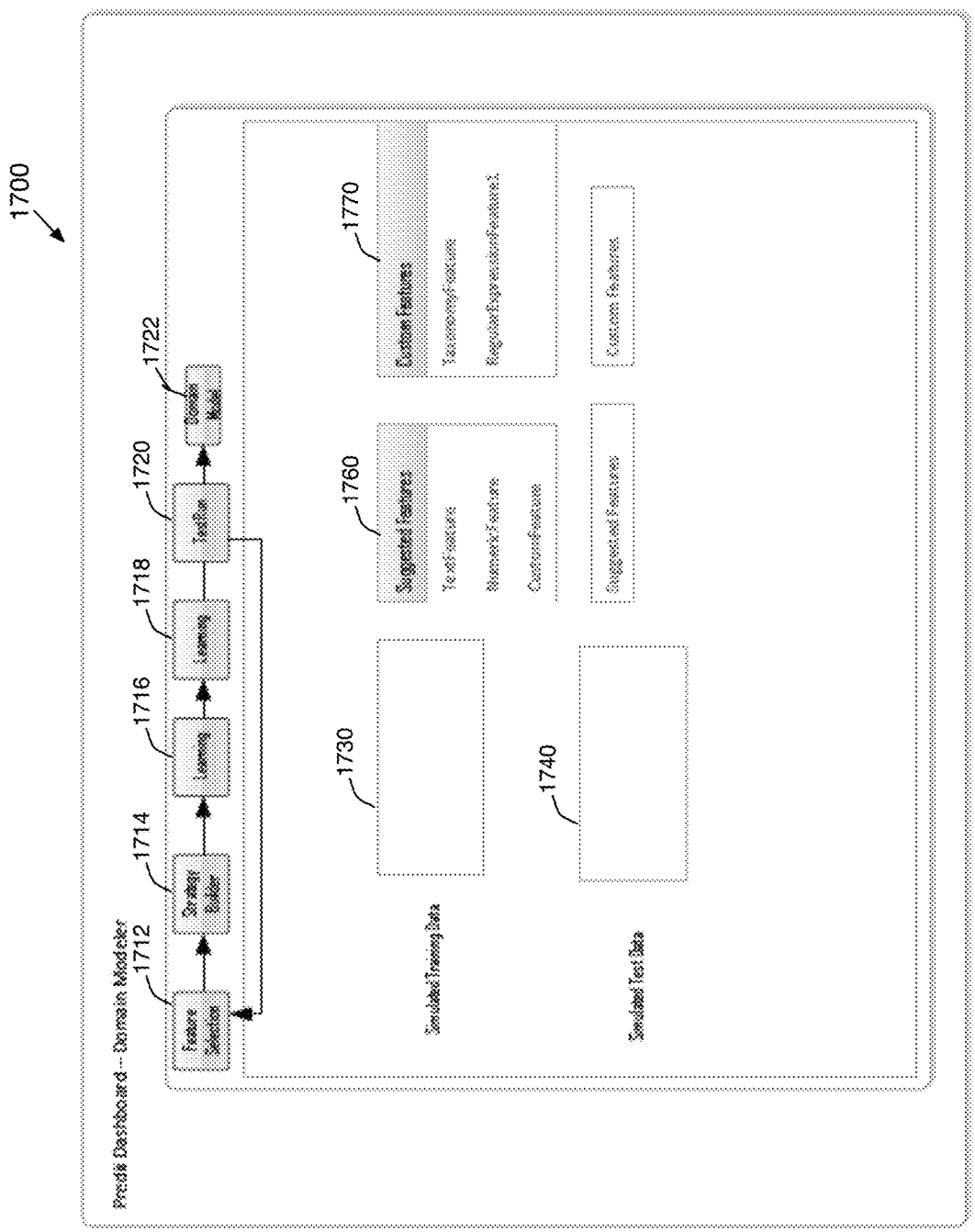
FIG. 17 is a schematic illustration of a dashboard for modeling a domain in accordance with an example embodiment.

An example of a user interface for building a domain model as in process 700 is shown in FIG. 17, using an example automotive service enterprise with enterprise data comprised of vehicle service orders and vehicle diagnostic data as training and test data to build the model.

VI. Adaptable Processing Modules

Figure 8:
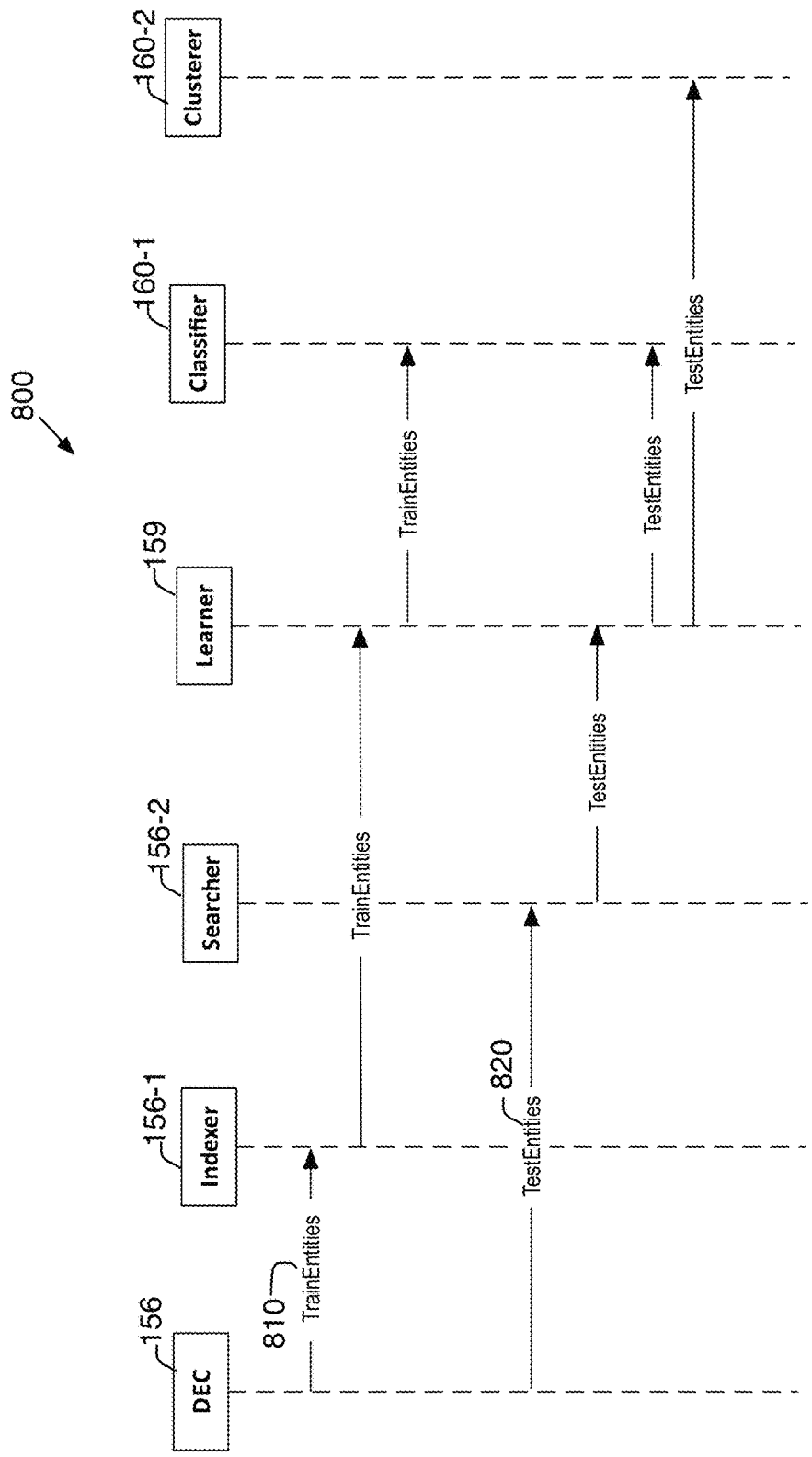
FIG. 8 is a sequence diagram of an adaptable runtime process, in accordance with an example embodiment.

FIG. 8 is a sequence diagram of an adaptable runtime process of platform 30, in accordance with an example embodiment. Processing of TrainEntities 810 and TestEntities 820 are shown from DEC 148 thorough modules of core 156, including indexer 156-1, searcher 156-2, learner 159, classifier 160-1, and clusterer 160-2. As discussed above with respect to FIG. 6, TrainEntities 810 and TestEntities 820 correspond to training data and test data, and each entity may comprise a hierarchy of attributes and features for adaptable modeling and processing of enterprise data.

In the embodiment 800 of FIG. 8, the sequence 810 for TrainEntites 810 may commence from DEC 148 to indexer 156-1, from indexer 156-1 to learner 159, and from learner 159 to classifier 160-1. The sequence for TestEntities 820 may commence from DEC 148 to searcher 156-2, and from searcher 156-2 to learner 159. From learner 159, TestEntites may progress to classifier 160-1 and/or to clusterer 160-2.

Figure 9:
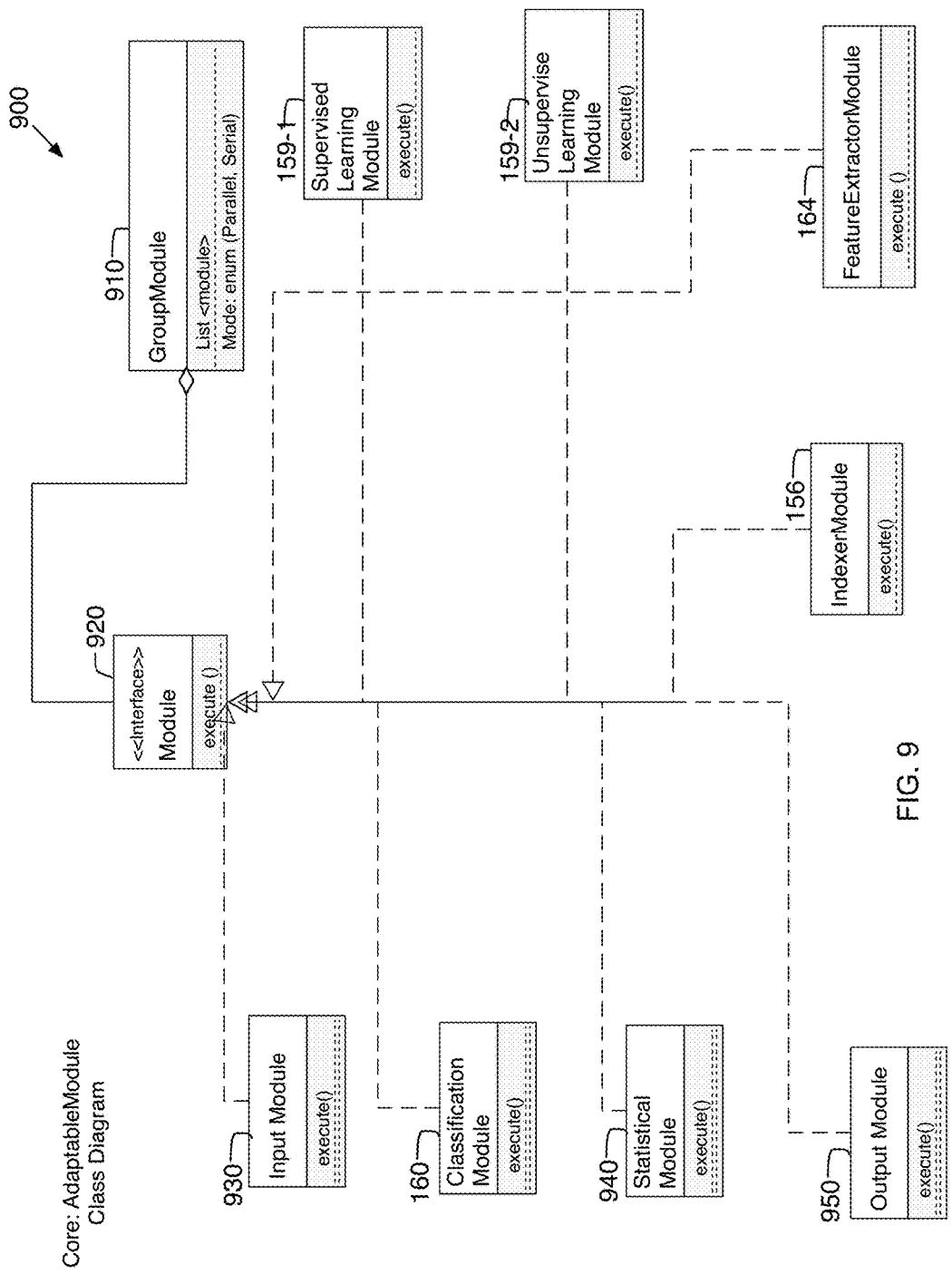
FIG. 9 is a class diagram of an adaptable module of the core engine, in accordance with an example embodiment.

FIG. 9 is a class diagram of an adaptable module 900 employed by domain modeler 150 of DEC 148 (of FIG. 1), in accordance with an example embodiment. Adaptable behavior is enabled by a configurable domain modeling strategy that provides a unique ability for a non-technical domain expert to efficiently develop, run, evaluate and deploy strategies for analyzing and processing enterprise information to suit specific applications. Domain modeler 150 allows interaction with a domain expert and applies domain expertise to define feature space (multiple features of interest to given problem), size of test data, size of training data, sample test data, and sample training data. The results of the domain modeling drives configurability of the modules within DEC 148 and processor core 154.

One aspect of a configurable module management strategy 900 is the ability for various modules to interact with each other and share information, e.g., between any combination of modules such as input module 930, indexer module 156, supervised learning module 159-1, unsupervised learning module 159-2, classification module 160, feature extractor module 164, statistical module 940, or output module 950. This may be achieved by a group module 910, or a collection of modules with well-defined connection between modules representing the order of execution and flow of information between the modules. Group module 910 is preferably a linear directed-graph of modules with no undirected-cycles. In such embodiment, the directed-edge determines the flow of information.

The collection of modules, represented abstractly by module 920, within group module 910 can be executed, for example, in two operational modes: serial execution and parallel execution as shown in 910. With the serial execution operator, all the modules in a group are executed in serial order. With the parallel execution operator, all the modules 920 in a group are executed in parallel. The output of all the modules will be collected and passed on as single output.

In some embodiments, group module 910 may have another group module encapsulated. This allows creating complicated and sophisticated work-flows with ease to the modeler.

As mentioned above, group module 910 for processing enterprise data may include a number of run-time modules 920, each of which may be a self-sufficient workable processing unit. Depending upon the desired application, modules 910 may include any of input module 930, indexer module 156, supervised learning module 159-1, unsupervised learning module 159-2, classification module 160, feature extractor module 164, statistical module 940, or output module 950. Any custom module may be built and plugged in into the architecture as desired.

Input modules 930 may be used by the DEC 148 runtime component to extract data from external data sources and pre-process them into entity representations. Thus, input module 930 may act as connector to the outer universe, this could be a database connector, RSS-Feed, Web-Crawler, File/Console Reader (e.g., any of connectors 310, 312, 314 or 316 of FIG. 3). Input module 930 may consume data from external source and convert it to the entity representation.

Supervised learning module 159-1 may use available supervised learning algorithms such as decision trees, linear classifiers, SVM's, KNN, graphical models, etc. for creating learning models. System 100 provides ease of changing parameters and evaluating impact on the test samples. The system may also recommend a best classifier and with best possible parameters, e.g., by performing regression analysis.

As enterprise data is often unclassified, unsupervised learning module 159-2 may be employed to support unsupervised and semi-supervised learning methodologies to classify and categorize enterprise data. This may include, for example, linear and non-linear regression, and clustering methods like K-means, and expectation maximization.

Classification module 160 may use the supervised learning models to classify/categorize the new stream of data. The classification module 160 aligns with the supervised algorithm used for building the module.

In statistical module 940, statistical parameters are computed over set of features as specified. The statistical figures can be used for gaining insight into the enterprise data and as well by the visualization engine 168 for generating and presenting visualization on dashboard 186.

A post-processing/summarizing module may utilize ranking algorithms, cleanup operations, normalization of the data and any kind of custom processing to be done, e.g., as shown in 416 of FIG. 4.

Output module 950 is configured depending on the format in which an enterprise requires its final data to be presented. For example, data could persisted to local database or file by the output module 950 or shared back with an enterprise solution, connected device or other enterprise system (e.g., 294-1, 294-2, 294-3 of FIG. 2) via a web service invocation.

Figure 10:
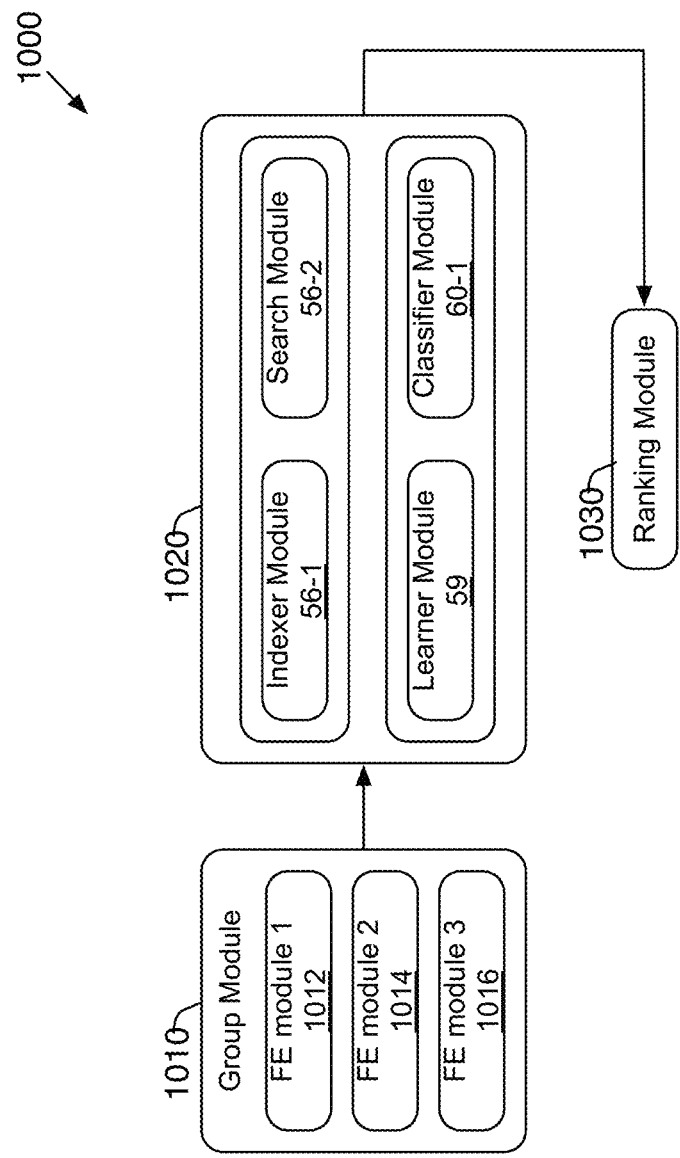
FIG. 10 is a diagram of an adaptable runtime module of a core engine, in accordance with an example embodiment.

FIG. 10 is a diagram of an adaptable module plugin of a core engine, in accordance with an example embodiment. In this example, module 1010 may include a number of feature extraction modules 1012, 1014, 1016, which may operate in parallel as shown. The collective output of module 1010 may flow into module 1020, which may be configured to include a number of modules, for example indexer 156-1 and search module 156-2, and learner module 159 and classifier module 160-1. The modules of 1020 may be configured to be executed in any desired manner for the desired application, e.g., indexer 156-1 and search 156-2 may be configured to operate serially. Learner 159 and classifier 160-1 may also operate serially with respect to each other, while each pair of serial modules (e.g., 156-1 and 156-2, and 159 and 160-1) operate in parallel. A collective output of module 1020 may then be processed by ranking module 1030.

VII. Feature Extraction

Figure 11:
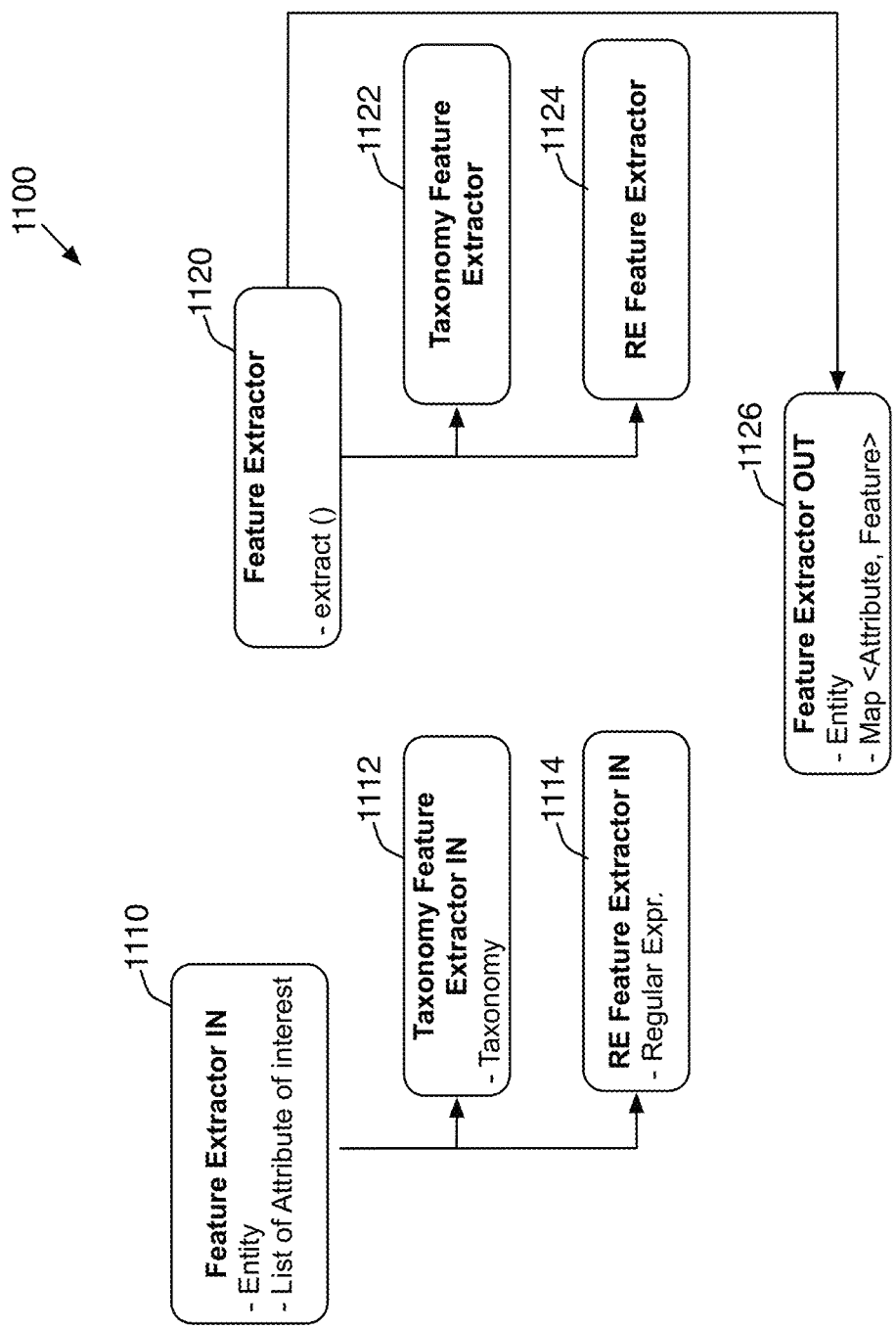
FIG. 11 is a class diagram of a feature extractor of a core engine, in accordance with an example embodiment.
Figure 12:
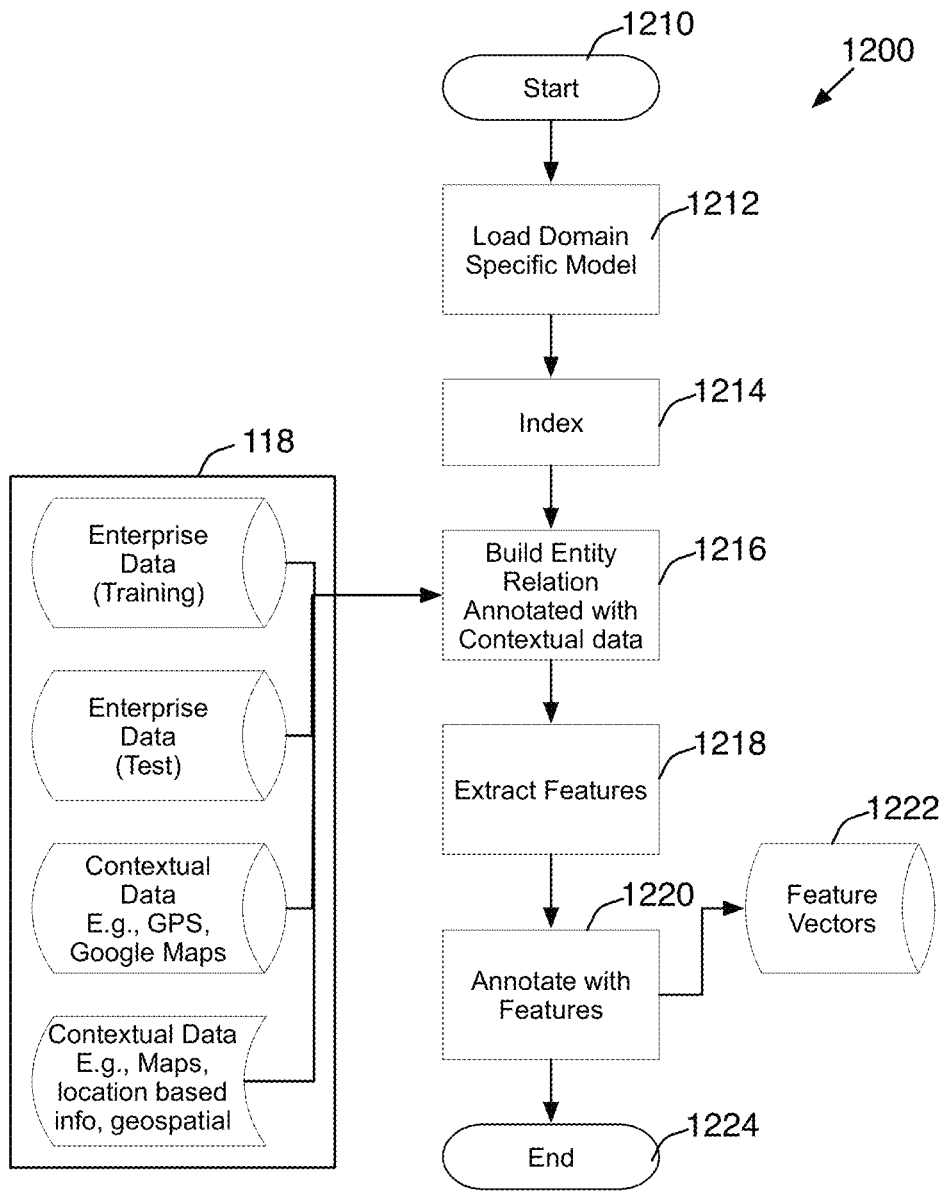
FIG. 12 is a flow chart of a feature extraction method, in accordance with an example embodiment.
Figure 13:
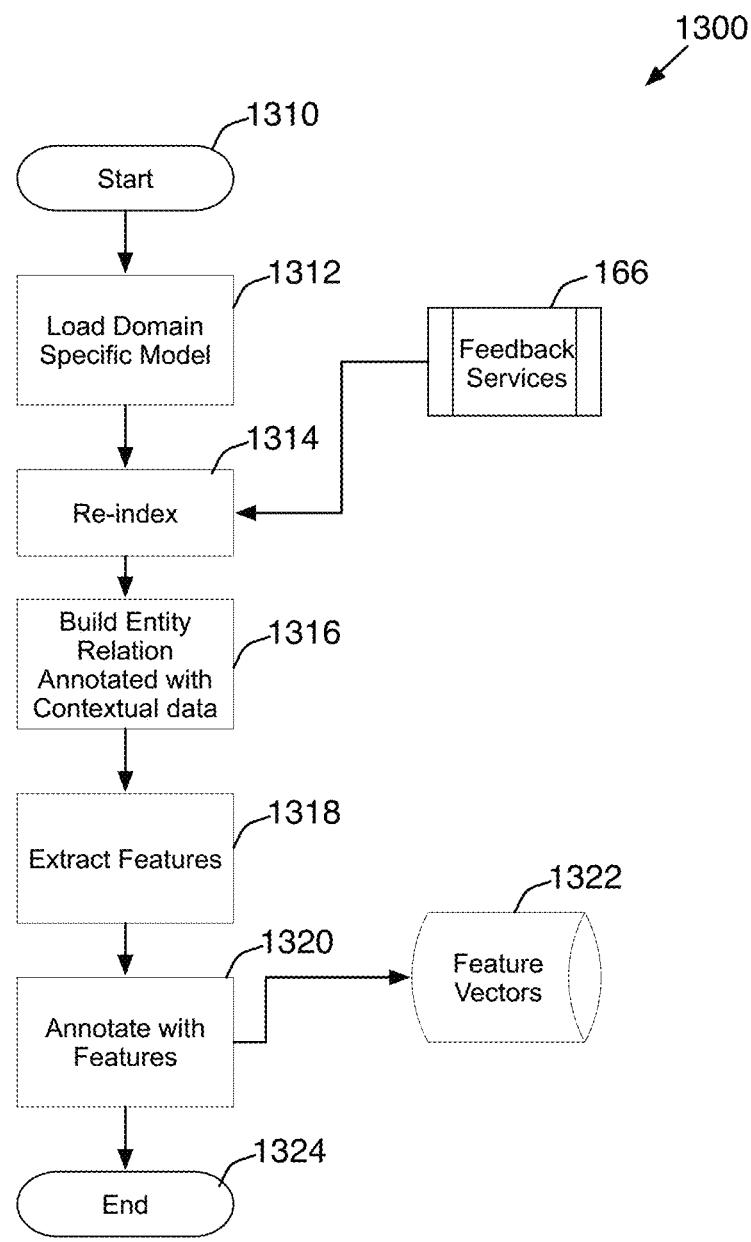
FIG. 13 is a flow chart of a realtime feature extraction method, in accordance with an example embodiment.

Turning now to FIGS. 11-13, feature extraction engine (FEE) 164 provides for quick definition of desired transformation, which plots an entity into hyper-space with each feature contributing towards a new dimension. FEE 164 also facilitates assignment of weights to the extracted feature. Preferably, FEE 164 is a versatile, customizable, configurable and scalable component of the system 100 applicable across various domains and to multiple enterprises.

FIG. 11 is a class diagram depicting aspects of a feature extractor 1100, include an abstract representation of a feature extractor 1120, for generating a feature extractor output 1126, and a feature extractor input 1110 and associated entities Default FEE provides a collection of inbuilt feature extractor tools and allows adding customized feature extractors. Some of the inbuilt feature extractor components may include:

a. Regular Expression Feature Extractor 1114: Provides extracting features that follow specific pattern, such as symbols, codes, registration numbers. The desired set (e.g., RegEx's) can be defined via configurable medium.

b. Named Entity Feature Extractor 1112: Used for extracting features associated with name of the Person, Place and Organization. Custom named entities can also be extracted from the content when provided with annotated learning data. FEE provides interface to learn customized named entities and to selectively configure a named entity recognizer.

c. Custom Ontology Feature Extractor: This feature extractor may be configured to consume the ontology specifically for the domain of interest. Ontology capture structural, syntactic and semantic information. The structural information is available from the hierarchical ontology representation, semantic inferencing can be done through an inference engine. The ontology may be applied over the attribute data to extract and infer features as described via configuration.

d. Custom Taxonomy Feature Extractor 1112, 1122: Many enterprises have their own set of taxonomies developed over the period which is rich source of knowledge base. One of the important set of features are extracted by searching taxonomy terms within attribute content. While doing so, extractor also provides flexibility in accommodating spelling mistakes, synonym matching, abbreviation and span search. These feature provides insight into the enterprises domain and data.

e. NLP Feature Extractor: NLP features include noun phrase, verb phrases, syntax trees and co-references. These features may be extracted from the textual content.

Custom Feature Extractors can be developed if need and plugged into the system and will be utilized just like any other Feature Extractor.

Referring to FIG. 12, an example feature extraction method 1200 is shown, e.g., using feature extractor concept 1100 of FIG. 11 within extraction engine 64 of FIGS. 1-3. Following the start 1210, a domain-specific model is loaded 1212. The model attributes are indexed 1214. Enterprise data 118, including training data, test data, and contextual data, is applied to the domain-specific module to build and entity relation annotated with contextual data in 1216. Features are then extracted 1218 and the model is annotated with features 1220 and stored as feature vectors 1222. When feature extraction is complete, the process ends 1224.

In FIG. 13, a method 1300 of using feature extraction engine 164 for realtime feature extraction is shown. This model may be the same domain-specific model that was processed in method 1200 above, where method 1300 is applied to further improve or augment the model using real time information. Following start 1310, the domain specific model is loaded 1312. Real-time information from feedback services 166-1 (of FIG. 2) is applied and the model is re-indexed 1314. The information may be, for example, from connected devices or user terminals in an enterprise. In the automotive service example, information provided by feedback services 166-1 may include a new work order entered by a service technician, or diagnostic information from a connected device, and/or involve a query from query engine 190. Using the re-indexed model, an entity relation annotated with contextual data is built or modified 1316. Features are extracted 1318, the model is annotated with features 1320, and feature vectors are stored 1322 as described above. The process ends at 1324.

As described with respect to other figures above (e.g., FIG. 3), the foregoing example feature extraction methods 1200 and 1300 may be applied using the system to any desired enterprise, including without limitation automotive, healthcare, home appliances, electronics, or aeronautics enterprises.

Figure 14:
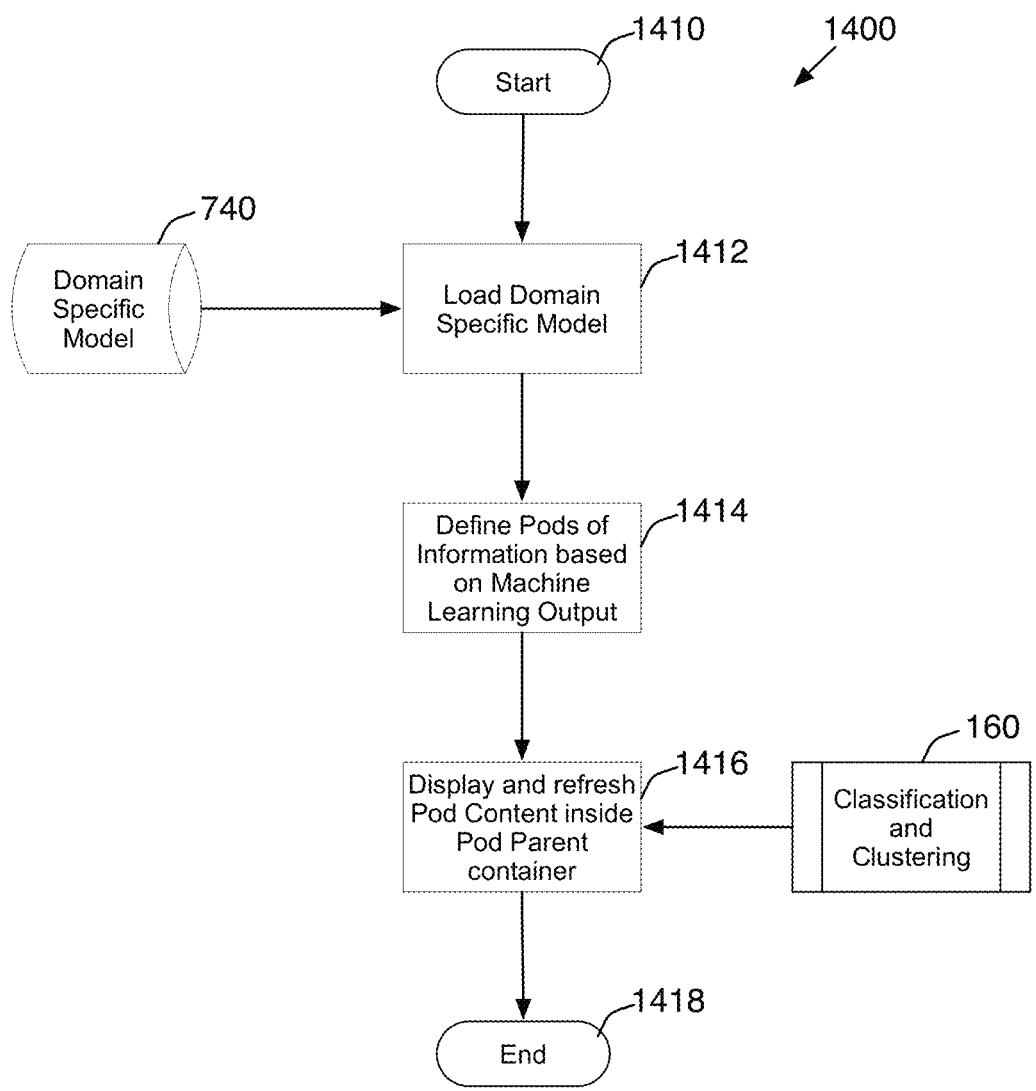
FIG. 14 is a flow chart of a visualization method, in accordance with an example embodiment.

Turning now to FIG. 14, a method for visualization 1400 is illustrated. After the start 1410, a domain specific model, e.g., model 740, is loaded 1412 into visualization engine (e.g., engine 168 of FIG. 1). Pods, or displayable units, of information are defined 1414 based on machine learning output, or based on the results of processing enterprise information applied to the domain-specific model using processing modules within core 154 of the system as described herein. Classification and clustering engine 160 may be applied to pods and pod content is displayed and refreshed 1416 inside a pod parent container, or a template for displaying pods. The process ends at 1418, e.g. when completed are displayed, e.g., via dashboard 286, or an end-user interface.

VIII. Adaptability/Building a Domain Model

Figure 15:
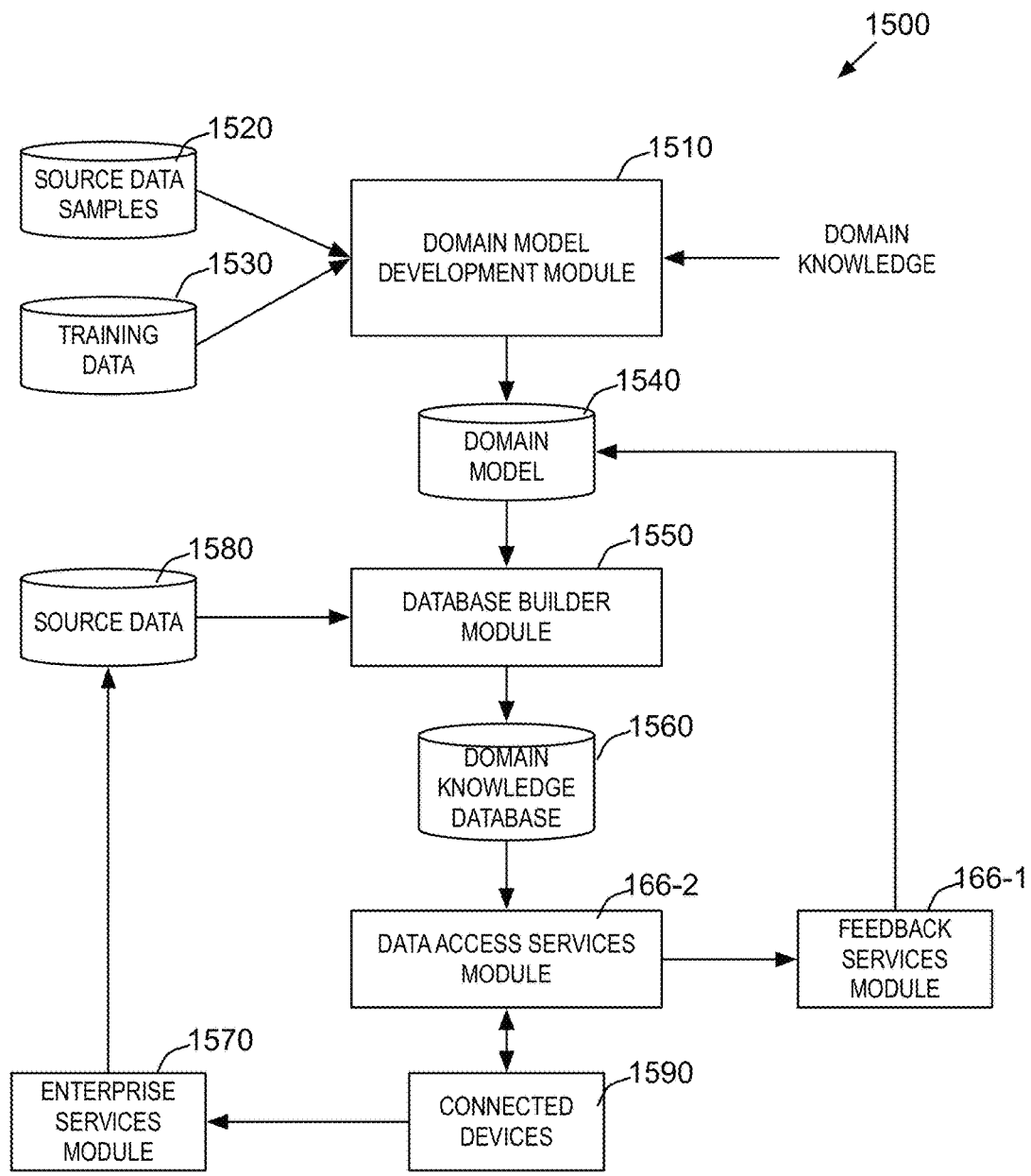
FIG. 15 is a schematic illustration of a system for building and improving a domain model in accordance with an example embodiment.
Figure 16:
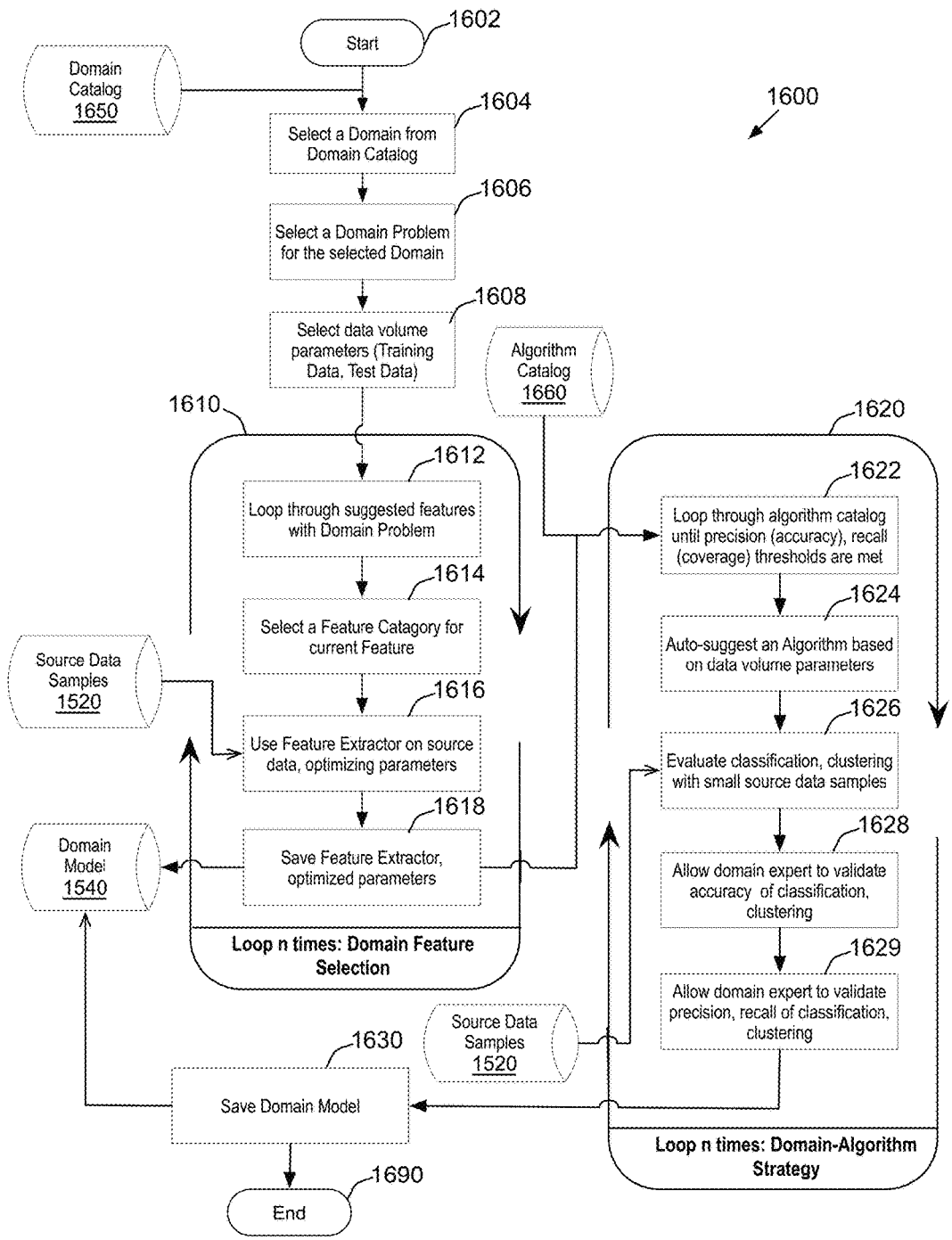
FIG. 16 is a flow chart of a method for adapting to different domains using domain modeling in accordance with an example embodiment.

FIGS. 15 and 16 illustrate another example subsystem 1500 and method 1600 for building and improving a domain model 1540 for any desired enterprise, e.g., using source data samples 1520, training data 1530 and domain knowledge to develop the model 1540 and additional enterprise data 118 and feedback from connected devices 1590 to improve the model. For example, source data samples 1520 may include just a few records of enterprise data as samples to feed into the domain development module 1510, which may include aspects and methods for feature extraction as shown, for example in FIG. 7 and/or as described in more detail below with respect to FIG. 16. In some embodiments, training data 1530 may include a larger collection (relative to source data samples 1520) of records pre-annotated.

Domain knowledge may also be ingested by the module 1510 and used to create a domain model (also referred to herein as an Entity-Relationship Model), an abstract example of which is shown in FIG. 6. Examples of domain knowledge, including an exemplary "DomainKnowledge" object data structure description and examples for different example domains, are shown and described Section IX below.

The database builder module 1550 may annotate all source data 1580 records in accordance with the domain model 1540, and update domain knowledge database 1560. A data access services module 166-2 may communicate with connected devices 1590 (e.g., enterprise devices 294-1 and/or 294-2 from FIG. 2) and feedback services module 166-1. The feedback services module 166-1 may collect user feedback relative to results from application of source data to the domain model (e.g., "like" or "wrong answer" or "a better answer is . . . "). In some embodiments, some queries may be placed into categories such as a "requires solution" category. Feedback from the feedback services module 166-1 may be used to periodically re-assign weights and re-learn classifications to improve the domain model. Connected devices 1590 also communicate with an enterprise services module 1570, e.g., to communicate newly created repair orders or other information from connected devices. Such information may be used by the enterprise services module 1570, for example, to periodically annotate newly received records which are added to source data 1580 and the domain knowledge database 1560.

FIG. 16 provides additional details of a method of adapting to different domains using domain modeling in accordance with one or more embodiments, e.g., using aspects of system 100 and/or subsystem 1500 (e.g., domain model development module 1510 of FIG. 15). After start 1602, a domain is selected 1604 from a domain catalog 1650, which may include a list of domains and associated parameters and data. Various domains may be included in the catalog, 1650, such as, for example, automotive service, other vehicle diagnostics, healthcare, radiation therapy, aviation, banking, HVAC service. See Section IX, F. below for example domains with details.

A domain problem may also be selected 1606 for the selected domain. For example, a domain problem for proactive maintenance of radiation therapy equipment may include, for example symptom of problem, failed components, trouble codes, error codes, etc. Data volume parameters may also be selected 1608, e.g., training data and test data.

A domain feature selection loop 1610 may then be performed, e.g., looping through suggested features associated with the domain problem 1612 and selecting a feature category for the current feature 1614. In the above-mentioned example of proactive maintenance of radiation therapy equipment, the feature category may include, for example, regular expression (regex), taxonomy, ontology, and/or natural language processing. A feature extractor may then be used 1616 on the source data samples 1520 to optimize parameters, and the feature extractor and optimized parameters are saved 1618 in the domain model 1540. This loop 1610 may be repeated n times to optimize parameters as necessary or desired.

The optimized output from 1618 may also be entered into an algorithm strategy loop 1620 for the domain, including looping 1622 through an algorithm catalog 1660 until precision (accuracy), recall (coverage) thresholds are met. The system may auto-suggest an algorithm based on data volume parameters 1624, and classification and clustering are evaluated 1626 with small source data samples 1520. A domain expert is allowed to validate accuracy of classification and clustering 1628 and to validate precision, recall of classification and clustering 1629. This loop 1620 may be repeated n times and the domain model 1540 is saved 1630 before ending 1690.

FIG. 17 is an illustration of a user interface (UI) 1700 of a dashboard 86 adapted for use by a domain expert to interact with the system to translate the expert's knowledge into a model (a priori and a posteriori). UI 1700 may include tabs or selectable features for any portion of the modeling process, including feature selection 1712, strategy builder 1714, learning 1716, 1718, test run 1720, and domain model 1722. Fields for entering and/or displaying simulated training data 1730 and simulated test data 1740 can be displayed, as well as display units for suggested features 1760 and custom features 1770.

IX. Enterprise Data Examples

The systems and methods described herein may be adapted to model into features applicable to any enterprise context and to drive classification and clustering of data. Enterprise context can be, for example, service repair data, customer transactional data, server performance data, or various other types of data applicable to an enterprise or an industry, or a particular service or application within an enterprise or industry. For example, a service repair business may have enterprise-specific data, records and other information concerning issues or symptoms, diagnoses, recommended actions, repairs, parts, and/or recommendations depending on the particular domain: e.g., automotive, healthcare, home appliances, electronics, aeronautics.

A. Vehicle Service Enterprise Example

In some embodiments, the systems and methods described herein may be used to process vehicle-service data, such as repair orders pertaining to vehicles repaired at a repair shop. Details of such example embodiments are also disclosed, for example, in U.S. Patent Application No. 61/899,833, titled "Methods and systems for using natural language processing and machine-learning to produce vehicle-service content", filed on Nov. 4, 2013, and U.S. patent application No. TBD, which was filed on Nov. 4, 2014, is titled "Methods and systems for using natural language processing and machine-learning to produce vehicle-service content,", each of which is incorporated by reference herein in its entirety. Processing the vehicle-service data can include, but is not limited to, determining a meaning of the vehicle-service data, generating metadata regarding the vehicle-service data or regarding the meaning of the vehicle-service data, and generating vehicle-service content (e.g., repair information) based, at least in part, on the metadata and a taxonomy defined for use by the system.

In this example, sources of vehicle-service data can include, for example, data from a vehicle repair shop, data from a vehicle manufacturer, or data from a vehicle repair technician. The vehicle-service data can include, for example, data from vehicle repair orders including financial data, parts data, or repair procedures.

Processing the vehicle-service data can include, but is not limited to, processing any type or types of vehicle-service data. Any of the vehicle-service data processed by the processor can include gibberish. Processing vehicle-service data including gibberish can result in determining a meaning of that vehicle-service data.

Figure 18:
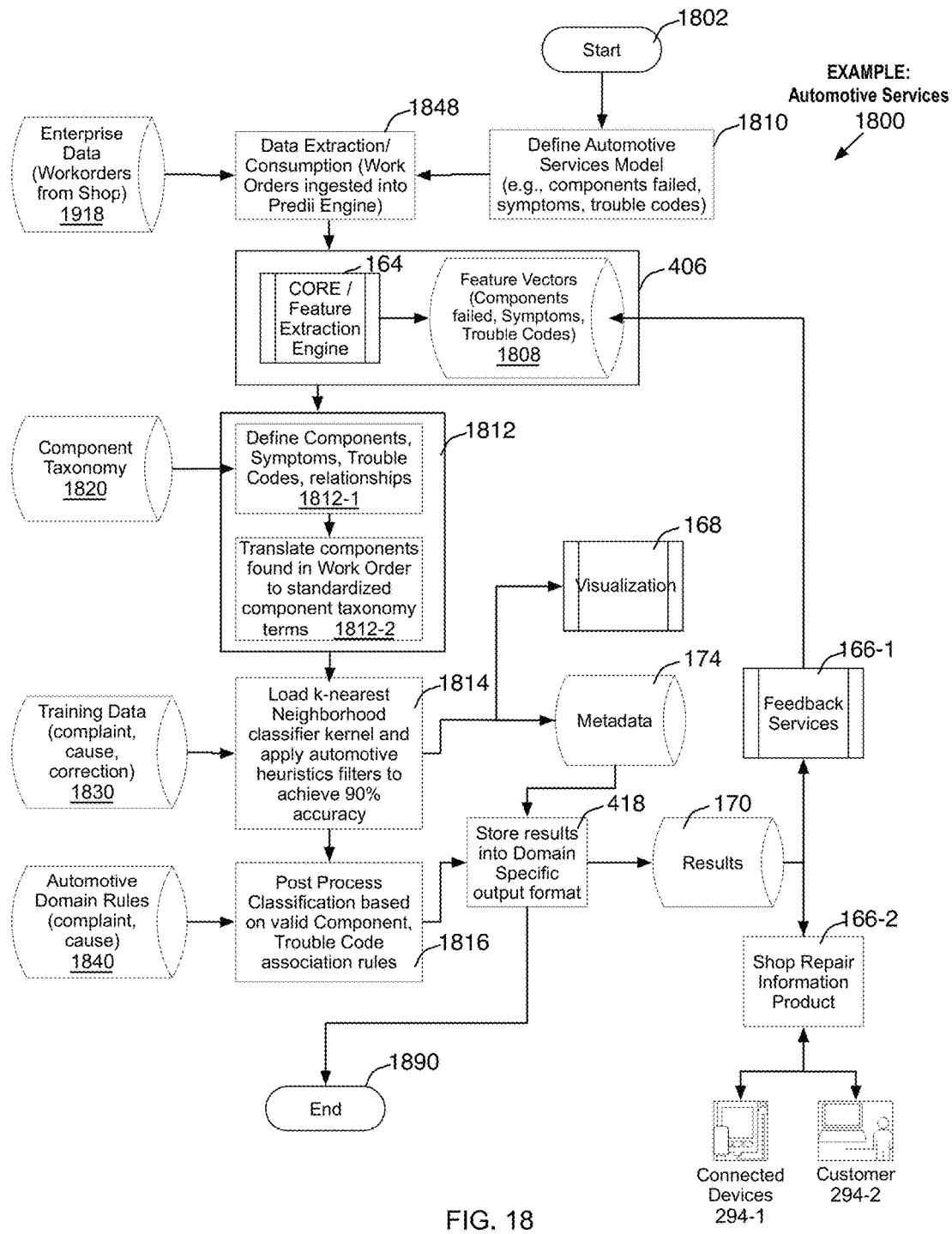
FIG. 18 is a flow chart of a method for processing automotive services data, in accordance with an example embodiment.

Referring to FIG. 18, an example method 1800 of processing vehicle service data, or work orders from mechanic shops or other vehicle service centers, is illustrated in accordance with one or more example embodiments. This example method 1800 is shown as a domain-specific example of method 400 of FIG. 4.

After start 1802, the domain model is defined 1810 with annotated features (e.g, components failed, symptoms, and trouble codes), and data extraction/consumption is performed 1848 on enterprise data 1918, e.g., including work orders, or automotive repair orders, from a repair shop, which are ingested into the system. In 406, feature extraction engine 164 is used to extract feature vectors 1808, e.g., corresponding to components failed, symptoms, and trouble codes. In 1812, features are aggregated, scores computed and normalized using component taxonomy 1820. This may include, for example, steps to define components, symptoms, trouble codes, and relationship 1812-1 and to translate components found in work order to standardized component taxonomy terms 1812-2.

Next, training data 1830, e.g., including complaint, cause, and correction data, may be applied in 1814 to load k-nearest neighborhood classifier kernel and apply automotive heuristics filters, to achieve, e.g. 90% accuracy. The output of machine learning processes 1814 may include metadata 174, which may be used by visualization engine 168, e.g., for display on dashboard 286, or may be stored 418 into domain-specific output format 418, e.g., in results store 170.

Alternatively, processed data from 1814 may undergo post-process classification 1816 for multi-class to single-class data, e.g., using automotive domain post processing rules 1840 (e.g., complaint, cause), and then stored as results into the applicable domain-specific (automotive) output format 418. For example, such post-processing may involve determining the top five solutions or query answers, possibly with additional ranking, weighting or scoring information.

Results 170 may be accessed or used in response to a query, for example, from a connected device 294-1 or other customer system 294-2 in communication with the System 100, e.g., via data access services from a shop repair information product 166-2. Feedback services 166-1 may be associated with a query engine 190 (of FIG. 1). As described herein, such query or feedback may be fed back into core 154 and processed in 406 to improve learning of the system, or to process a user query and return relevant information.

B. Domain Model

The following data examples provide an example of how the system adapts to different business problems.

Domain Knowledge {
   aprioriList of type List<Knowledge>;
   aposterioriList of type List<Knowledge>;
}
Knowledge {
   features of type List<Feature>;
   rules of type List<Feature Rule>;
}
Feature {
   name of type string;
   description of type string;
}
Feature Rule {
   conditions of type List<Conditions>;
   actions of type List<Action>;
}
Condition {
   Expressions;
   Operators;
   Evaluation;
}
Action {
   Command;
   entities in Domain Data;
}
Domain Data {
   entities of type List<Entity>;
}
Entity {
   attributes of type List<Attribute>;
}

Domain Knowledge

In some embodiments, the domain knowledge model represents of two types of knowledge base for feature extracting. The first is apriori knowledge, where given a set of predefined results, the system will extract features from the domain data set and systematically match them with existing training data. The second is aposteriori knowledge where the system is trained with the help of domain experts offering specific clues for the system.

Knowledge

In some embodiments, the knowledge data encapsulates a list of features to look for in the domain data set, as defined by domain meta data, and a list of rules to apply to the data.

Feature

In some embodiments the feature model is a description of features that are to be extracted from the domain data set.

Feature Rule

In some embodiments the feature rule contains a set of conditions that must be met before applying the list of actions to the domain data set.

Condition

In some embodiments conditions represent a combination of logic expressions and operators to test for, and an evaluation of those expressions.

Action

In some embodiments actions represent an enrichment to be applied to the data.

C. Domain Model Example aPriori Example:

A repair code 123 has known list of a commonly failed components O2 Sensor, Intake Gasket.

Knowledge {
features: ["code", "component" ]
feature rules: [{"code=123 && component in ('O2 Sensor', 'Intake Gasket')", "set to to matching fix" } ]
} aPosteriori Example:

When P0128, P0302, P0304 occurs, focus only on P0128 because if P0128 is cleared, P0302, P0304 automatically gets cleared.

Knowledge {
features: ["code]
feature rules: [{"code in (P0128, P0302, P0304)", "set priority to P0128 only" } ]
} aPriori Example:

A repair code "123" has known list of a commonly failed components O2 Sensor, Intake Gasket.

Knowledge {
features: ["code", "component" ]
feature rules: [{"code=123 && component in ('O2 Sensor', 'Intake Gasket')", "set to to matching fix" } ]
} aPosteriori Example:

When codes P0128, P0302, P0304 occur, focus only on P0128 because if P0128 is cleared, P0302, P0304 automatically gets cleared.

Knowledge {
features: ["code]
feature rules: [{"code in (P0128, P0302, P0304)", "set priority to P0128 only" } ]
}

D. Data Examples

TABLE 1

| Business problem | Interaction | Input to Predii (Repair request, customer complaint, facebook post, twitter feed) | Volume of data |
|---|---|---|---|
| Fix cars faster | Shop advisor responds to customer complaint at shop | The truck is running bad, hard to start. Fuel Intake manifold gasket. There is a code of P01XYZ and P030X. Took the upper intake manifold off. | 300 Million |
| Easy diagnosis of heavy equipment using a mobile phone | Heavy Euipment Operator trying to self-diagnose by searching in troubleshooter | Vibrating, showing Error code E01, 101, 102 for a Komatsu Pc600. | 10 Million |
| Consumer sentiment analysis of a new product launch | Marketing manager trying to analyse customer complaints, twitter posts, facebook posts | Not receiving text messages, phone quality choppy, Samsung Dxx30 not powering up, love this phone | 200 Million |

TABLE 2

| Noun Phrase1 | Verb | Noun Phrase | Noun Phrase | Taxonomy/ Ontology | Features | Solution | Domain |
|---|---|---|---|---|---|---|---|
| P0XYZ, P030X | Replaced | Fuel Injector set | hard to start | Parts list, OEM Parts | Codes, Part, Action taken, Symptom | P0654, P030X, Replaced Injectors and Pressure Regulator | Automotive |
| E01, 101,102 | cleaned | Governor/ Throttle | vibrating | Komatasu OE parts, ErrorCodes | Codes, Part, Action taken, Symptom | E01, 101, 102 cleaned Governor/ Thottle Sensor | Heavy Equipment |
| Dxx30 | | | not powering up | Sentiment-Taxonomy | Samsung model, sentiment, complaints | | Retail |

E. Additional DomainKnowledge Object Details and Examples

In some embodiments, the domain model and all domain analysis operations to be performed on that model can be found in the DomainKnowledge object. This object specifies all attributes of the domain model, as well as key attributes required for content extraction, attributes used in facet searches, and attributes used in aggregation of data. The object also specifies the operations leading to any insights the platform can extract from the content.

The following is an interface of the top level Domain-Knowledge object.

| DomainKnowledge | |
|---|---|
| getIdKeys( ) | List<KeyAttribute> |
| getFacets( ) | List<FacetAttribute> |
| getContents( ) | List<ContentAttribute> |
| getNs( ) | String |
| getNsType( ) | String |
| getDomainEnrichments( ) | List<DomainEnrichment> |

Key attributes These are attributes of the domain object that acts as a key, to uniquely identify the object. This could be single attribute, or a combination of attributes.

Facet attributes Facet attributes are used for the purposes of indexing and searching.

Content attributes Content attributes are strings where the data can be found to perform analysis on. Insights into the domain model can be extracted or inferred from these attributes.

Domain Enrichments Data analysis operations to be performed in sequence on the content attributes Name space Domain namespace Name space type Specific domain object in the namespace JSON Weather Example

```
{
  "ns":"org.myweathertrends",
  "nsType":"DailyForecast",
  "attributes":{
     "id":{
        "className":"com.predii.core.model.KeyAttribute",
        "name":"id"
     },
     "zip":{
        "className":"com.predii.core.model.FacetAttribute",
        "name":"zip"
     },
     "city":{
        "className":"com.predii.core.model.FacetAttribute",
        "name":"city"
     },
     "temperature":{
        "className":"com.predii.core.model.ContentAttribute",
        "name":"temperature"
     },
     "weatherReport":{
        "className":"com.predii.core.model.ContentAttribute",
        "name":"weatherReport"
     },
     "longitude":{
        "name":"longitude"
     },
     "latitude":{
        "name":"latitude"
     }
  },
  "idKeys":[
     {
        "name":"id",
        "attributeKind" : "KEY",
        "indexable" : false,
        "store" : true
     }
  ],
  "facetAttributes":[
     {
        "name":"zip"
     },
     {
        "name":"city"
     }
  ],
  "contentAttributes":[
     {
        "name":"temperature",
        "indexable": true,
        "store" : true
     },
     {
        "name":"weatherReport",
        "store":false
     }
  ],
  "domainEnrichments":[
     {
        "label":"temperature",
        "enrichmentType": "REGEX",
        "contentAttributes" : [
           {
              "name": "temperature"
           },
           {
              "name": "weatherReport"
           }
        ]
     },
     {
        "label":"weatherTrends",
        "enrichmentType": "TAXONOMY",
        "contentAttributes" : [
           {
              "name": "weatherReport"
           }
        ]
     }
  ]
}
```

JSON Weather Entity Example

```
[
  {
    id: "1",
    zip: 95148,
    temperature: 80,
    weatherReport: "Slightly cloudy, with a chance of rain",
    city: "San Jose",
    longitude: "37.3293624",
    latitude: "−121.763782, 6549m"
  },
  {
    id: "2",
    zip: 95376,
    temperature: 90,
    weatherReport: "Sunshine. Hot",
    city: "Tracy",
    longitude: "37.7341374",
    latitude: "−121.4257385, 13z"
  }
]
```

JSON Automotive Example

```
{
  "ns": "com.momandpop",
  "nsType": "WorkOrder",
  "attributes": {
     "id": {
        "name": "workId",
        "className":"com.predii.core.model.KeyAttribute"
     },
     "ModelYear": {
        "className":"com.predii.core.model.FacetAttribute",
        "name": "ModelYear"
     },
     "Make": {
        "className":"com.predii.core.model.FacetAttribute",
        "name": "Make"
     },
     "Model": {
```

```
            "className":"com.predii.core.model.FacetAttribute",
            "name": "Model"
        },
        "SubModel": {
            "className":"com.predii.core.model.FacetAttribute",
            "name": "SubModel"
        },
        "Engine": {
            "className":"com.predii.core.model.FacetAttribute",
            "name": "Engine"
        },
        "WorkOrderDesc": {
            "className":"com.predii.core.model.ContentAttribute",
            "name": "WorkOrderDesc"
        },
        "Odometer": {
            "name": "Odometer"
        }
    },
    "idKeys": [
        {
            "name": "workId",
            "attributeKind": "KEY",
            "indexable":false,
            "store":true
        }
    ],
    "facetAttributes": [
        {
            "name": "ModelYear",
            "indexable":true,
            "store":false
        },
        {
            "name": "Make",
            "indexable":true,
            "store":false
        },
        {
            "name": "Model",
            "indexable":true,
            "store":false
        },
        {
            "name": "SubModel",
            "indexable":true,
            "store":false
        }
    ],
    "contentAttributes": [
        {
            "name": "WorkOrderDesc",
            "indexable":false,
            "store":false
        }
    ],
    "enrichments": [
        {
            "label": "component",
            "enrichmentType": "TAXONOMY",
            "contentAttributes": [{
                "name": "WorkOrderDesc"
            }],
            "enrichmentConfigs": {
                "taxonomy":"component.taxonomy"
            }
        },
        {
            "label": "code",
            "enrichmentType": "REGEX",
            "cleansers" : [{
                    "enrichmentType": "REGEX",
                    "enrichmentConfigs": {
                        "regex":"code.noise.regex"
                    }
            }],
            "contentAttributes": [{
                "name": "WorkOrderDesc"
            }],
            "enrichmentConfigs": {
                "regex":"code.regex"
            }
        }
    ]
}
```

JSON Automotive Entity Example

```
[
    {
        workId: "11111",
        ModelYear: 2010,
        Make: "Toyota",
        Model: "Sienna",
        SubModel: "LE",
        Engine: " ",
        WorkOrderDesc: "Plugged in scan tool. Found P0300.
            Replaced spark plugs",
        odometer: 55123
    }
]
```

F. Other Domain Examples

Figure 19:
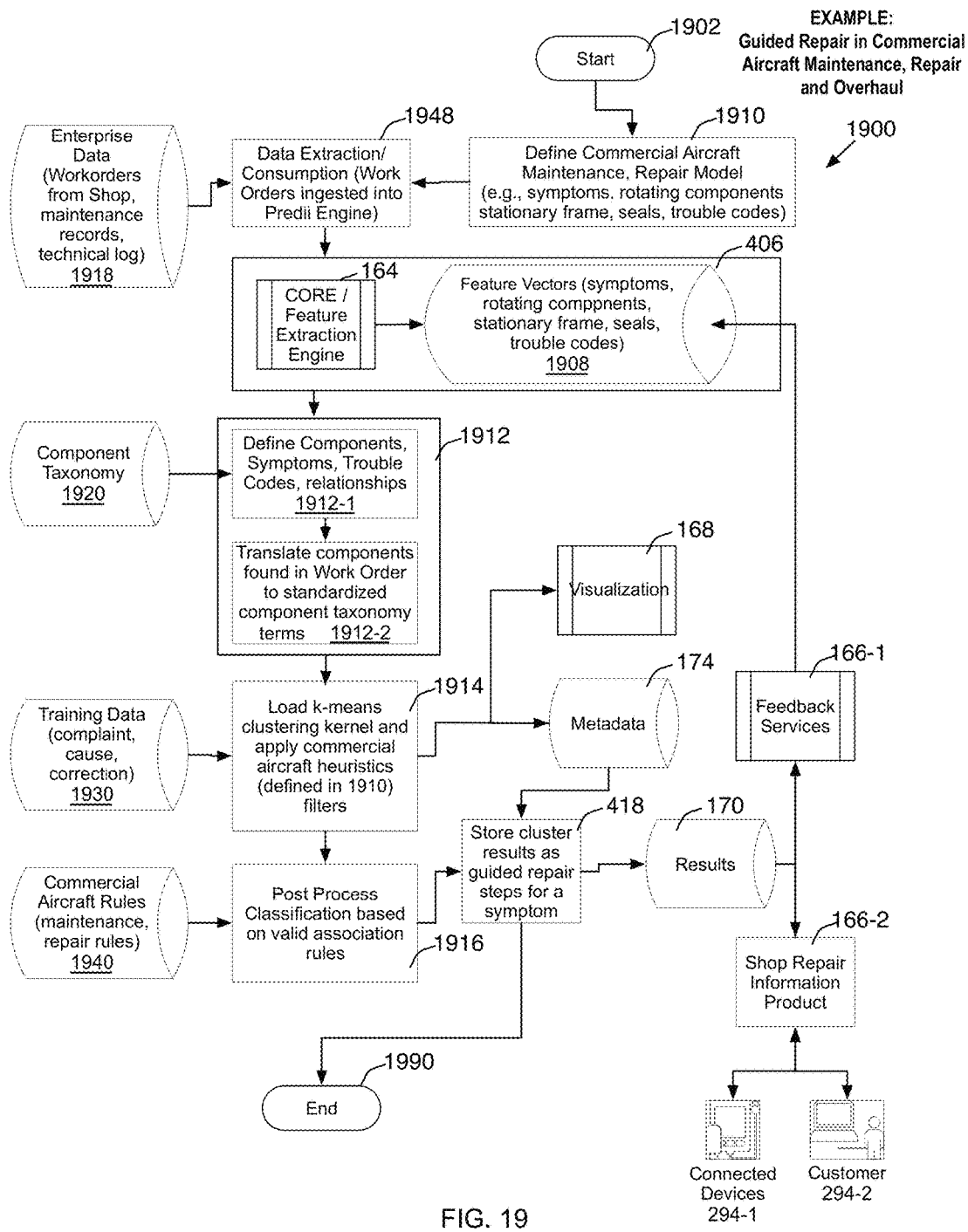
FIG. 19 is a flow chart of a method for processing commercial aircraft maintenance, repair and overhaul data, in accordance with an example embodiment.

Another example domain for which the systems and methods described herein may be employed is commercial aircraft maintenance. Referring to FIG. 19, an example method 1900 for guided repair in commercial aircraft maintenance, repair and overhaul, which in this example employs similar steps to the automotive domain method 1800 of FIG. 18, and is another domain-specific example of abstract method 400 of FIG. 4.

After start 1902, the domain model is defined 1910 with annotated features (e.g., symptoms, rotating components stationary frame, seals, trouble codes), and data extraction/consumption is performed 1948 on enterprise data 1918, e.g., including work orders from Shop, maintenance records, technical log, which are ingested into the Predii engine. In 406, feature extraction engine 164 is used to extract feature vectors 1908, e.g., corresponding to symptoms, rotating components stationary frame, seals, trouble codes. In 1912, features are aggregated, scores computed and normalized using component taxonomy 1920. This may include, for example, steps to define components, symptoms, trouble codes, and relationship 1912-1 and to translate components found in work order to standardized component taxonomy terms 1912-2.

Next, training data 1930, e.g., including complaint, cause, and correction data, may be applied in 1914 to load k-means clustering kernel and apply commercial aircraft heuristics (defined in 1910) filters. The output of machine learning processes 1914 may include metadata 174, which may be used by visualization engine 168, e.g., for display on dashboard 286, or may be stored 418 into domain-specific output format 418, e.g., in results store 170. Alternatively, processed data from 1914 may undergo post-process classification 1916 for multi-class to single-class data, e.g., using automotive domain post processing rules 1940 (e.g., maintenance, repair rules applicable to commercial aircraft), and then stored as results into the applicable domain-specific output format 418. For example, such post-processing may involve determining the top five solutions or query answers, possibly with additional ranking, weighting or scoring information.

Results 170 may be accessed or used in response to a query, for example, from a connected device 294-1 or other customer system 294-2 in communication with the System 100, e.g., via data access services from a shop repair information product 166-2. Feedback services 166-1 may be associated with a query engine 190 (of FIG. 1). As described herein, such query or feedback may be fed back into core 154 and processed in 406 to improve learning of the system, or to process a user query and return relevant information.

As discussed above, the systems and methods described herein are adaptable to process data in a variety of domains. The following is a list of other example domains and associated features, but one skilled in the art will appreciate that various other domains may be applied without departing from the scope hereof:

Domain: Healthcare

Problem: Reduce the amount of time spent by insurance processors to determine validity of insurance claim and suggest what is covered, not covered by insurance.

Data: Anonymized health insurance claims data, patient health records.

Features: CPT Code, Cost, Primary Diagnosis, Disease site, Insurance coverage.

Domain: Banks, Loan Processing

Problem: Determine qualification of loan based on loan application. reduce time spent by loan officer in determining loan risk.

Data sources: Credit appraisal, loan application, home appraisal, loan appraiser notes, legal documentation.

Domain: Healthcare Equipment: Radiation Oncology

Problem: Reduce downtime of healthcare equipment such as scanners for radiation oncology.

Data sources: Equipment repair history, technician repair records, records for similar equipment; factory component records.

Features: Tested components, failed components, trouble codes, symptoms, diagnostic information.

Domain: Fleet Management

Problem: Maintaining a stable operations require minimal downtime of fleet (rental cars, trucks); proactive maintenance/guided repair of vehicles lowering maintenance costs and reducing downtime of vehicles.

Data sources: Repair history of fleet, repair history of similar engine vehicles in industry, Real Fix information Features: Tested component, failed component, trouble code, symptom, diagnostic information from scanners, telematics data from vehicle.

IX. Conclusion

The foregoing description illustrates various embodiments along with examples of how aspects of the systems may be implemented. The above examples and embodiments should not be deemed to be the only embodiments, and are presented to illustrate the flexibility and advantages of the systems as defined by the following claims. In the figures, similar symbols typically identify similar components, unless context dictates otherwise. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the sequence diagrams and flow charts in the figures and as discussed herein, each block and/or communication may represent a processing of information and/or a transmission of information in accordance with example embodiments. Alternative embodiments are included within the scope of these example embodiments. In these alternative embodiments, for example, functions described as blocks, transmissions, communications, requests, responses, and/or messages may be executed out of order from that shown or discussed, including substantially concurrent or in reverse order, depending on the functionality involved. Further, more or fewer blocks and/or functions may be used with any of the diagrams, scenarios, and flow charts discussed herein, and these diagrams, scenarios, and flow charts may be combined with one another, in part or in whole.

A block that represents a processing of information may correspond to circuitry that can be configured to perform the specific logical functions of a herein-described method or technique. Alternatively or additionally, a block that represents a processing of information may correspond to a module, a segment, or a portion of program code (including related data). Functional aspects described as modules need not be arranged or stored as a unit, and may include instructions, routines or program code distributed, stored and executed in any manner. The program code may include one or more instructions executable by a processor for implementing specific logical functions or actions in the method or technique. The program code and/or related data may be stored on any type of computer readable medium such as a storage device including a disk or hard drive or other storage medium.

The computer readable medium may also include non-transitory computer readable media such as computer-readable media that stores data for short periods of time like register memory, processor cache, and random access memory (RAM). The computer readable media may also include non-transitory computer readable media that stores program code and/or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

Moreover, a block that represents one or more information transmissions may correspond to information transmissions between software and/or hardware modules in the same physical device. However, other information transmissions may be between software modules and/or hardware modules in different physical devices.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method, comprising:
    building a domain model for processing data specific to an enterprise;
    applying historical enterprise data and contextual data to the model to build entity relations annotated with contextual data;
    wherein said method comprises sending said enterprise data and/or said contextual data to one or more of an importer module, an extraction module, a learning module, a classification module, a feedback module, a scoring module, and/or an export module;

extracting features of interest from the annotated entity relations defined in the domain model;
classifying and clustering the features to develop enterprise-specific metadata;
storing the metadata for use by the domain model; and
receiving and applying expert feedback to improve the model.

2. The method of claim 1, wherein building the domain model comprises:
adapting enterprise data by allowing expert to identify the features of interest;
auto-suggesting appropriate learning algorithm; and
interacting with the expert to learn domain knowledge.

3. The method of claim 2, further comprising:
receiving a query from an end user for information related to the enterprise;
generating a response from the metadata; and
returning the response to the end user.

4. The method of claim 1, wherein the enterprise data comprises unstructured data, said method further comprising:
associating and adapting a domain-specific meaning to the unstructured data using the extracted features; and
generating metadata associated with the enterprise data based on the domain model.

5. The method of claim 4, further comprising applying a plurality of domain-specific taxonomy terms from the domain model and a selected algorithm from an algorithm catalog to the enterprise data to extract meaning from the enterprise data.

6. The method of claim 1, wherein the domain model comprises a plurality of parameters associated with a domain corresponding to the enterprise data, and building the domain model comprises:
selecting a domain from a domain catalog;
selecting a domain problem for the selected domain, wherein the catalog includes suggested features for the domain problem;
looping through the suggested features;
using a feature extractor on source data samples to optimize the plurality of parameters;
and saving the optimized parameters in the domain model.

7. The method of claim 6, wherein building the domain model further comprises:
looping through an algorithm catalog until defined thresholds are met;
auto-suggesting an algorithm based on data volume parameters;
evaluating results from the suggested algorithm using source data samples;
allowing a domain expert to validate the results; and
saving the results to the domain model.

8. A method comprising:
identifying, by a natural language processor, that a computer-readable enterprise data represents terms of a natural human language that match one or more taxonomy terms within a defined taxonomy searchable by the natural language processor;
associating, by the natural language processor, a meaning with the enterprise data based on the terms of the natural human language represented by the enterprise data that match the one or more taxonomy terms;
generating, by the natural language processor, metadata that represents the meaning associated with the enterprise data;
providing the metadata to a data processing machine for generating content based at least in part on the metadata; and
wherein said method comprises sending said enterprise data and/or said metadata to one or more of an importer module, an extraction module, a learning module, a classification module, a feedback module, a scoring module, and/or an export module.

9. The method of claim 8, wherein the natural human language processor comprises a domain model development module for developing a domain model comprising the defined taxonomy applicable to the enterprise data.

10. A computing device comprising a processor and a computer-readable medium storing program instructions, that when executed by the processor, cause the computing device to perform a set of functions comprising:
identifying that a computer-readable vehicle enterprise data represents terms of a natural human language that match one or more taxonomy terms within a defined taxonomy searchable by the processor;
associating, by the processor, a meaning with the enterprise data based on the terms of the natural human language represented by the enterprise data that match the one or more taxonomy terms;
generating, by the processor, metadata that represents the meaning associated with the enterprise data;
providing the metadata to a data processing machine for generating content based at least in part on the metadata; and
wherein said functions comprise sending said enterprise data and/or said metadata to one or more of an importer module, an extraction module, a learning module, a classification module, a feedback module, a scoring module, and/or an export module.

11. The computing device of claim 10, wherein the natural human language processor comprises a domain model development module for developing a domain model comprising the defined taxonomy applicable to the enterprise data.

* * * * *